US008589975B2

(12) United States Patent
McKissick et al.

(10) Patent No.: US 8,589,975 B2
(45) Date of Patent: *Nov. 19, 2013

(54) ELECTRONIC PROGRAM GUIDE WITH ADVANCE NOTIFICATION

(75) Inventors: Pamela L. McKissick, Tulsa, OK (US); Madeleine A. Forrer, Tulsa, OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,939

(22) Filed: Sep. 28, 2009

(65) Prior Publication Data

US 2010/0107194 A1    Apr. 29, 2010

Related U.S. Application Data

(63) Continuation of application No. 09/378,533, filed on Aug. 20, 1999, now abandoned.

(60) Provisional application No. 60/097,504, filed on Aug. 21, 1998.

(51) Int. Cl.
*H04N 5/445* (2011.01)

(52) U.S. Cl.
USPC ............... 725/37; 725/39; 725/40; 725/53; 725/58

(58) Field of Classification Search
USPC ................................. 725/39, 50–52
See application file for complete search history.

(56) References Cited

U.S. PATENT DOCUMENTS

| 4,071,697 | A |   | 1/1978  | Bushnell et al. |       |
|-----------|---|---|---------|-----------------|-------|
| 4,706,121 | A |   | 11/1987 | Young           |       |
| 4,872,005 | A |   | 10/1989 | DeLuca et al.   |       |
| 4,977,455 | A |   | 12/1990 | Young           |       |
| 5,224,156 | A |   | 6/1993  | Fuller et al.   |       |
| 5,351,075 | A | * | 9/1994  | Herz et al.     | 725/13 |
| 5,353,121 | A |   | 10/1994 | Young et al.    |       |
| 5,410,344 | A |   | 4/1995  | Graves et al.   |       |
| 5,412,720 | A |   | 5/1995  | Hoarty          |       |
| 5,485,197 | A | * | 1/1996  | Hoarty          | 725/37 |
| 5,553,221 | A |   | 9/1996  | Reimer et al.   |       |

(Continued)

FOREIGN PATENT DOCUMENTS

| EP | 0 721 253 | 7/1996 |
| EP | 0 848 554 | 6/1998 |

(Continued)

OTHER PUBLICATIONS

"NDS Opens a New York Office to Focus on Developing Interactive TV Systems and Application for U.S. Market," Business Wire, pp. 1-3, Jan. 24, 2001.

(Continued)

*Primary Examiner* — An Son P Huynh
(74) *Attorney, Agent, or Firm* — Ropes & Gray LLP

(57) ABSTRACT

A non-frame television program guide notification system is provided. The system allows a user at a system to order and receive notifications of non-frame television programs. The user can order notifications by selecting a program or supplying a program title directly. The user can specify when and how often the notifications will be generated and received. If desired, the user can view a list of all currently requested notifications. Entries can be added to the list or the user can cancel a previously ordered notification.

16 Claims, 24 Drawing Sheets

(56) References Cited

U.S. PATENT DOCUMENTS

| | | | |
|---|---|---|---|
| 5,557,338 A | 9/1996 | Maze et al. | |
| 5,573,244 A | 11/1996 | Mindes | |
| 5,583,560 A | 12/1996 | Florin et al. | |
| 5,589,892 A | 12/1996 | Knee et al. | |
| 5,594,661 A | 1/1997 | Bruner et al. | |
| 5,600,364 A | 2/1997 | Hendricks et al. | |
| 5,617,565 A | 4/1997 | Augenbraun et al. | |
| 5,623,613 A | 4/1997 | Rowe et al. | |
| 5,629,733 A | 5/1997 | Youman et al. | |
| 5,635,978 A | 6/1997 | Alten et al. | |
| 5,635,989 A * | 6/1997 | Rothmuller | 725/46 |
| 5,659,350 A | 8/1997 | Hendricks et al. | |
| 5,673,089 A | 9/1997 | Yuen et al. | |
| 5,678,170 A | 10/1997 | Grube et al. | |
| 5,680,617 A | 10/1997 | Gough et al. | |
| 5,699,107 A | 12/1997 | Lawler et al. | |
| 5,769,714 A | 6/1998 | Wiener et al. | |
| 5,801,787 A | 9/1998 | Schein et al. | |
| 5,809,204 A | 9/1998 | Young et al. | |
| 5,812,931 A | 9/1998 | Yuen | |
| 5,830,068 A | 11/1998 | Brenner et al. | |
| 5,850,218 A | 12/1998 | LaJoie et al. | |
| 5,886,746 A | 3/1999 | Yuen et al. | |
| 5,940,073 A | 8/1999 | Klosterman et al. | |
| 5,945,988 A * | 8/1999 | Williams et al. | 715/747 |
| 5,986,650 A | 11/1999 | Ellis et al. | |
| 6,002,394 A | 12/1999 | Schein et al. | |
| 6,004,211 A | 12/1999 | Brenner et al. | |
| 6,005,565 A | 12/1999 | Legall et al. | |
| 6,008,802 A * | 12/1999 | Iki et al. | 715/721 |
| 6,016,141 A | 1/2000 | Knudson et al. | |
| 6,061,056 A | 5/2000 | Menard et al. | |
| 6,061,097 A | 5/2000 | Satterfield | |
| 6,089,981 A | 7/2000 | Brenner et al. | |
| 6,099,409 A | 8/2000 | Brenner et al. | |
| 6,133,909 A | 10/2000 | Schein et al. | |
| 6,147,715 A | 11/2000 | Yuen et al. | |
| 6,177,931 B1 | 1/2001 | Alexander et al. | |
| 6,208,335 B1 * | 3/2001 | Gordon et al. | 715/721 |
| 6,216,264 B1 * | 4/2001 | Maze et al. | 725/53 |
| 6,219,839 B1 | 4/2001 | Sampsell | |
| 6,226,444 B1 | 5/2001 | Goldschmidt Iki et al. | |
| 6,226,618 B1 | 5/2001 | Downs et al. | |
| 6,239,794 B1 | 5/2001 | Yuen et al. | |
| 6,247,176 B1 * | 6/2001 | Schein et al. | 725/43 |
| 6,256,071 B1 | 7/2001 | Hiroi | |
| 6,263,501 B1 | 7/2001 | Schein et al. | |
| 6,275,268 B1 | 8/2001 | Ellis et al. | |
| 6,282,713 B1 | 8/2001 | Kitsukawa et al. | |
| 6,289,346 B1 | 9/2001 | Milewski et al. | |
| 6,308,328 B1 | 10/2001 | Bowcutt et al. | |
| 6,324,338 B1 | 11/2001 | Wood et al. | |
| 6,331,877 B1 | 12/2001 | Bennington et al. | |
| 6,347,086 B1 | 2/2002 | Strachan | |
| 6,358,150 B1 | 3/2002 | Mir et al. | |
| 6,369,840 B1 * | 4/2002 | Barnett et al. | 715/853 |
| 6,388,714 B1 | 5/2002 | Schein et al. | |
| 6,418,556 B1 | 7/2002 | Bennington et al. | |
| 6,532,589 B1 | 3/2003 | Proehl et al. | |
| 6,536,041 B1 | 3/2003 | Knudson et al. | |
| 6,539,548 B1 | 3/2003 | Hendricks et al. | |
| 6,542,882 B1 | 4/2003 | Smith | |
| 6,554,708 B1 | 4/2003 | Brenner et al. | |
| 6,554,709 B1 | 4/2003 | Brenner et al. | |
| 6,564,378 B1 | 5/2003 | Satterfield et al. | |
| 6,571,390 B1 | 5/2003 | Dunn et al. | |
| 6,614,987 B1 | 9/2003 | Ismail et al. | |
| 6,651,253 B2 | 11/2003 | Dudkiewicz et al. | |
| 6,656,042 B2 | 12/2003 | Reiss et al. | |
| 6,674,448 B1 | 1/2004 | Garahi et al. | |
| 6,712,701 B1 | 3/2004 | Boylan, III et al. | |
| 6,721,954 B1 * | 4/2004 | Nickum | 725/46 |
| 6,721,956 B2 | 4/2004 | Wasilewski | |
| 6,742,183 B1 | 5/2004 | Reynolds et al. | |
| 6,756,997 B1 | 6/2004 | Ward, III et al. | |
| 6,757,906 B1 | 6/2004 | Look et al. | |
| 6,810,526 B1 | 10/2004 | Menard et al. | |
| 6,813,777 B1 | 11/2004 | Weinberger et al. | |
| 6,851,090 B1 | 2/2005 | Gutta et al. | |
| 6,865,746 B1 | 3/2005 | Herrington et al. | |
| 6,868,225 B1 | 3/2005 | Brown et al. | |
| 6,897,904 B2 | 5/2005 | Potrebic et al. | |
| 6,898,762 B2 * | 5/2005 | Ellis et al. | 725/46 |
| 6,909,708 B1 | 6/2005 | Krishnaswamy et al. | |
| 6,910,965 B2 | 6/2005 | Downes | |
| 6,943,845 B2 | 9/2005 | Mizutome et al. | |
| 7,003,791 B2 | 2/2006 | Mizutani | |
| 7,013,478 B1 | 3/2006 | Hendricks et al. | |
| 7,017,172 B2 | 3/2006 | Schaffer et al. | |
| 7,055,166 B1 | 5/2006 | Logan et al. | |
| 7,136,829 B2 | 11/2006 | Hellal et al. | |
| 7,152,236 B1 | 12/2006 | Wugofski et al. | |
| 7,165,098 B1 | 1/2007 | Boyer et al. | |
| 7,172,508 B2 | 2/2007 | Simon et al. | |
| 7,185,355 B1 * | 2/2007 | Ellis et al. | 725/46 |
| 7,206,892 B2 | 4/2007 | Kim et al. | |
| 7,213,089 B2 | 5/2007 | Hatakenaka | |
| 7,231,607 B2 | 6/2007 | Neely et al. | |
| 7,260,823 B2 | 8/2007 | Schlack et al. | |
| 7,283,992 B2 | 10/2007 | Liu et al. | |
| 7,296,284 B1 | 11/2007 | Price et al. | |
| 7,334,195 B2 | 2/2008 | Gemmell et al. | |
| 7,343,614 B1 * | 3/2008 | Hendricks et al. | 725/8 |
| 7,379,886 B1 | 5/2008 | Zaring et al. | |
| 7,386,871 B1 | 6/2008 | Knudson et al. | |
| 7,440,950 B2 | 10/2008 | Horvitz et al. | |
| 7,458,093 B2 | 11/2008 | Dukes et al. | |
| 7,458,891 B2 | 12/2008 | Asher et al. | |
| 7,477,954 B2 | 1/2009 | LaNeve | |
| 7,496,941 B2 | 2/2009 | Russo | |
| 7,603,685 B2 | 10/2009 | Knudson et al. | |
| 7,607,975 B2 | 10/2009 | Sato et al. | |
| 7,640,564 B2 | 12/2009 | Green et al. | |
| 7,657,907 B2 | 2/2010 | Fennan et al. | |
| 7,673,314 B2 | 3/2010 | Ellis et al. | |
| 7,681,217 B2 | 3/2010 | Iwabuchi et al. | |
| 7,689,556 B2 | 3/2010 | Garg et al. | |
| 7,690,019 B2 | 3/2010 | Yamamoto et al. | |
| 7,694,319 B1 * | 4/2010 | Hassell et al. | 725/34 |
| 7,699,701 B2 | 4/2010 | Corbo | |
| 7,738,765 B2 | 6/2010 | Matsuno et al. | |
| 7,761,892 B2 * | 7/2010 | Ellis et al. | 725/44 |
| 7,783,632 B2 | 8/2010 | Richardson et al. | |
| 7,825,987 B2 | 11/2010 | Yui et al. | |
| 7,861,258 B2 | 12/2010 | Barton et al. | |
| 7,895,624 B1 * | 2/2011 | Thomas et al. | 725/44 |
| 7,958,533 B2 | 6/2011 | Kikinis et al. | |
| 2001/0031656 A1 | 10/2001 | Marshall et al. | |
| 2001/0039209 A1 | 11/2001 | DeWeese et al. | |
| 2001/0047298 A1 | 11/2001 | Moore et al. | |
| 2002/0026496 A1 | 2/2002 | Boyer et al. | |
| 2002/0034980 A1 | 3/2002 | Lemmons et al. | |
| 2002/0035697 A1 | 3/2002 | McCurdy et al. | |
| 2002/0042913 A1 | 4/2002 | Ellis et al. | |
| 2002/0056119 A1 | 5/2002 | Moynihan | |
| 2002/0059610 A1 | 5/2002 | Ellis | |
| 2002/0059621 A1 | 5/2002 | Thomas et al. | |
| 2002/0075402 A1 | 6/2002 | Robson et al. | |
| 2002/0078447 A1 | 6/2002 | Mizutome et al. | |
| 2002/0078453 A1 | 6/2002 | Kuo | |
| 2002/0108113 A1 | 8/2002 | Schaffer et al. | |
| 2002/0112239 A1 | 8/2002 | Goldman | |
| 2002/0115488 A1 | 8/2002 | Berry et al. | |
| 2002/0120507 A1 | 8/2002 | Chanos et al. | |
| 2002/0124247 A1 | 9/2002 | Houghton | |
| 2002/0129368 A1 | 9/2002 | Schlack et al. | |
| 2002/0151340 A1 | 10/2002 | Guinn et al. | |
| 2002/0157099 A1 | 10/2002 | Schrader et al. | |
| 2002/0165770 A1 | 11/2002 | Khoo et al. | |
| 2002/0174430 A1 | 11/2002 | Ellis et al. | |
| 2002/0194600 A1 | 12/2002 | Ellis et al. | |
| 2002/0198052 A1 | 12/2002 | Soltys et al. | |
| 2003/0005445 A1 | 1/2003 | Schein et al. | |
| 2003/0040962 A1 * | 2/2003 | Lewis | 705/14 |

(56) References Cited

U.S. PATENT DOCUMENTS

| | | |
|---|---|---|
| 2003/0093792 A1 | 5/2003 | Labeeb et al. |
| 2003/0093803 A1 | 5/2003 | Ishikawa et al. |
| 2003/0110163 A1 | 6/2003 | Chen et al. |
| 2003/0110499 A1 | 6/2003 | Knudson et al. |
| 2003/0126600 A1 | 7/2003 | Heuvelman |
| 2003/0131355 A1 | 7/2003 | Berenson et al. |
| 2003/0131356 A1* | 7/2003 | Proehl et al. ............ 725/58 |
| 2003/0144057 A1 | 7/2003 | Brenner et al. |
| 2003/0149621 A1 | 8/2003 | Shteyn |
| 2003/0149980 A1 | 8/2003 | Hassell et al. |
| 2003/0154478 A1 | 8/2003 | Hassell et al. |
| 2003/0167467 A1 | 9/2003 | Allen et al. |
| 2003/0177497 A1 | 9/2003 | Macrae et al. |
| 2003/0182658 A1 | 9/2003 | Alexander |
| 2003/0196201 A1 | 10/2003 | Schein et al. |
| 2003/0224847 A1 | 12/2003 | Jaimet |
| 2003/0225777 A1 | 12/2003 | Marsh |
| 2004/0003391 A1 | 1/2004 | Gutta et al. |
| 2004/0025180 A1 | 2/2004 | Begeja et al. |
| 2004/0064835 A1 | 4/2004 | Bellwood et al. |
| 2004/0068745 A1 | 4/2004 | Yamamoto et al. |
| 2004/0073918 A1 | 4/2004 | Ferman et al. |
| 2004/0096184 A1 | 5/2004 | Poslinsky |
| 2004/0103434 A1 | 5/2004 | Ellis |
| 2004/0103437 A1 | 5/2004 | Allegrezza et al. |
| 2004/0117831 A1 | 6/2004 | Ellis et al. |
| 2004/0128685 A1 | 7/2004 | Hassell et al. |
| 2004/0128686 A1 | 7/2004 | Boyer et al. |
| 2004/0139047 A1 | 7/2004 | Rechsteiner et al. |
| 2004/0177370 A1 | 9/2004 | Dudkiewicz |
| 2004/0210926 A1 | 10/2004 | Francis et al. |
| 2004/0210932 A1 | 10/2004 | Mori et al. |
| 2004/0218905 A1 | 11/2004 | Green et al. |
| 2004/0239812 A1 | 12/2004 | Park et al. |
| 2005/0015405 A1 | 1/2005 | Plastina et al. |
| 2005/0028208 A1 | 2/2005 | Ellis et al. |
| 2005/0028218 A1 | 2/2005 | Blake |
| 2005/0120373 A1 | 6/2005 | Thomas et al. |
| 2005/0158023 A1 | 7/2005 | Takasu et al. |
| 2005/0160461 A1 | 7/2005 | Baumgartner et al. |
| 2005/0166230 A1 | 7/2005 | Gaydou et al. |
| 2005/0204388 A1 | 9/2005 | Knudson et al. |
| 2005/0208995 A1 | 9/2005 | Marshall et al. |
| 2005/0235319 A1 | 10/2005 | Carpenter et al. |
| 2005/0251827 A1 | 11/2005 | Ellis et al. |
| 2005/0278741 A1* | 12/2005 | Robarts et al. ............ 725/46 |
| 2005/0278768 A1 | 12/2005 | Boyer et al. |
| 2006/0020973 A1 | 1/2006 | Hannum et al. |
| 2006/0026635 A1 | 2/2006 | Potrebic et al. |
| 2006/0026648 A1 | 2/2006 | Kirihara et al. |
| 2006/0026665 A1 | 2/2006 | Rodriguez et al. |
| 2006/0053449 A1 | 3/2006 | Gutta |
| 2006/0218573 A1 | 9/2006 | Proebstel |
| 2006/0218604 A1 | 9/2006 | Riedl et al. |
| 2006/0236360 A1 | 10/2006 | Yuen et al. |
| 2006/0253874 A1 | 11/2006 | Stark et al. |
| 2006/0271953 A1 | 11/2006 | Jacoby et al. |
| 2006/0294073 A1 | 12/2006 | Hamadi |
| 2006/0294574 A1 | 12/2006 | Cha |
| 2007/0039023 A1 | 2/2007 | Kataoka |
| 2007/0055989 A1 | 3/2007 | Shanks et al. |
| 2007/0060380 A1 | 3/2007 | McMonigle et al. |
| 2007/0067271 A1 | 3/2007 | Lu |
| 2007/0074245 A1 | 3/2007 | Nyako et al. |
| 2007/0078822 A1 | 4/2007 | Cucerzan et al. |
| 2007/0089132 A1 | 4/2007 | Qureshey et al. |
| 2007/0112740 A1 | 5/2007 | Geva |
| 2007/0130089 A1 | 6/2007 | Chiu |
| 2007/0162502 A1 | 7/2007 | Thomas et al. |
| 2007/0162850 A1 | 7/2007 | Adler et al. |
| 2007/0169148 A1 | 7/2007 | Oddo et al. |
| 2007/0186240 A1 | 8/2007 | Ward et al. |
| 2007/0192796 A1 | 8/2007 | Iwabuchi et al. |
| 2007/0214132 A1 | 9/2007 | Grubb et al. |
| 2007/0250861 A1 | 10/2007 | Angiolillo et al. |
| 2007/0277218 A1 | 11/2007 | Borden |
| 2008/0062318 A1 | 3/2008 | Ellis et al. |
| 2008/0066111 A1 | 3/2008 | Ellis et al. |
| 2008/0092155 A1 | 4/2008 | Ferrone et al. |
| 2008/0092156 A1 | 4/2008 | Ferrone |
| 2008/0104057 A1 | 5/2008 | Billmaier et al. |
| 2008/0104127 A1 | 5/2008 | Billmaier et al. |
| 2008/0182649 A1 | 7/2008 | Marshall et al. |
| 2008/0184294 A1 | 7/2008 | Lemmons et al. |
| 2010/0107194 A1 | 4/2010 | McKissick et al. |
| 2010/0131983 A1 | 5/2010 | Shannon et al. |
| 2010/0153885 A1 | 6/2010 | Yates |
| 2010/0175092 A1 | 7/2010 | Kikinis et al. |
| 2010/0287590 A1 | 11/2010 | Knudson et al. |

FOREIGN PATENT DOCUMENTS

| | | |
|---|---|---|
| EP | 0 854 645 | 7/1998 |
| EP | 1363452 A1 | 11/2003 |
| EP | 1 463 307 A2 | 9/2004 |
| JP | 09-037233 | 2/1997 |
| JP | 10243309 | 9/1998 |
| JP | 11-308547 | 11/1999 |
| JP | 2003-219298 A | 7/2003 |
| WO | WO 97/13368 | 4/1997 |
| WO | WO 98/26584 | 6/1998 |
| WO | WO 98/27723 | 6/1998 |
| WO | WO 98/43183 | 10/1998 |
| WO | WO 99/01984 | 1/1999 |
| WO | WO 99/04561 | 1/1999 |
| WO | WO-00/33576 A1 | 6/2000 |
| WO | WO 00/38428 | 6/2000 |
| WO | WO 01/15438 | 3/2001 |
| WO | WO-01/91458 A2 | 11/2001 |
| WO | WO-03/043320 A2 | 5/2003 |
| WO | WO-2008/016617 A2 | 2/2008 |

OTHER PUBLICATIONS

"TiVo Viewer's Guide: How to Activate and Use Your TiVo Service," SDOC-00057-000 Rev. B, 2002.

Hogan, "ShopNBC Winks at ITV," Multichannel News, pp. 1-2, Jun. 25, 2001.

Shaw, "The Interactive Living Revolution," Multichannel News, pp. 1-3, Mar. 31, 2003.

Susanne Boll, Utz Westermann: "Meeting Experience: MediÆther: An Event Space for Context-Aware Multimedia Experiences," Proceedings of the 2003 ACM SIGMM Workshop on Experiential Telepresence ETP '03, Online Nov. 7, 2003, pp. 21-30, XP002434278, Berkley, California, ISBN: 1-58113-775-3, Retrieved from the internet—URL: http://delivery.acm.org/10.1145/990000/982488/p21-boll.pdf?key1=982488&key2=9969139711&coll=portal&dl=ACM&CFID=2181828&CFTOKEN=68827537>, retrieved on May 16, 2007.

Waltner, "Cable Nets Eye New Interactive Services (Interactive Television)," Multichannel News, pp. 3-5, Feb. 23, 1998.

U.S. Appl. No. 08/938,028, filed Sep. 18, 1997.
U.S. Appl. No. 09/034,939, filed Mar. 4, 1998.
U.S. Appl. No. 60/097,538, filed Aug. 21, 1998.
U.S. Appl. No. 60/107,802, filed Nov. 10, 1998.
U.S. Appl. No. 09/330,792, filed Jun. 11, 1999.
U.S. Appl. No. 09/378,533, filed Aug. 20, 1999.

Van Barneveld et al., "Designing Usable Interfaces for TV Recommender Systems," Personalized Digital Television, 6:259-286 (2004) XP-002417580 pp. 1-28.

A Scenario for the Deployment of Interactive Multimedia Cable Television Systems in The United States in the 1990's, Matthew D. Miller, Proceedings of the IEEE, vol. 82, No. 4, Apr. 1994, pp. 585-589.

An Open-Systems Approach to Video on Demand, Yee-Hsiang Chang et al., IEEE Communications Magazine, May 1994.

TrackMaster User's Guide Version 2.0.7, Apr. 1994, AXCIS Pocket Information Network, Inc., Santa Clara, California.

Video Technology News, Feb. 14, 1994 pp. 7 and 8.

* cited by examiner

FIG. 18A

| | 1:30PM | 2:00 | 2:30 | 3:00 |
|---|---|---|---|---|
| SAT 7 | | | | |
| 2 KCBS | COLLEGE FOOTBALL ARMY VS. NAVY | | COLLEGE BASKETBALL KANSAS AT UCLA | |
| 4 KNBC | COLLEGE BASKETBALL JOHN WOODEN CLASSIC – ARIZONA VS. UTAH | | | COLLEGE BASKETBALL |
| 5 KTLA | SYLVESTOR & TWEETY MYS | SAVED BY BELL COLLEGE | SAVED BY BELL COLLEGE | CALIFORNIA DREAMS |
| 6 ESPN | GOLF | | | PGA GOLF |
| 7 KABC | COLLEGE FOOTBALL BIG 12 CHAMPIONSHIP – TEAMS TO BE ANNOUNCED | | | |
| 9 KCAL | PAID PROGRAM | HITCH HICKER | MAGIC OF CHRISTMAS | |
| 10 CNN | YOUR MONEY | COMPUTER CONNECTION | MONEYWEEK | INSIDE BUSINESS |
| 11 KTTV | WMAC MASTERS | WCW WORLD WIDE WRESTLING | | |
| 12 MTV | REAL WORLD | REAL WORLD | REAL WORLD | GILLIGAN'S ISLAND |
| 13 KCOP | PAID PROGRAM | PRIMAL FEAR | | REAL WORLD |
| 15 FOXA | TENNIS | WOMAN'S COLLEGE SOCCER | | |

COMING SOON PROGRAM SCREEN

CLOSER LOOK

TIME | CHANNEL
CATEGORY | SEARCH

SELECT DAY TO VIEW
| S | M | T | W | T | F | S |
|---|---|---|---|---|---|---|
| | 1 | 2 | 3 | 4 | 5 | 6 | 7 |
| 8 | 9 | 10 | 11 | 12 | 13 | 14 |
| 15 | 16 | 17 | 18 | 19 | 20 | 21 |

SELECT TIME OF DAY
| EARLY | MORNING |
| MID-DAY | AFTERNOON |
| PRIME TIME | LATE NITE |
| CURRENT | |

NEW NOTIFICATIONS

VIEW CURRENT NOTIFICATIONS

USER PREFERENCE PROFILE

FIG. 19

ENTER NAME:
ENTER E-MAIL ADDRESS:
ADDRESS 2:

NOTIFY ME:
○ ONCE ONLY
○ EACH TIME BEING BROADCAST
○ EACH TIME THIS MONTH.
○ OTHER

HOW SOON BEFORE EVENT DO YOU WANT TO BE NOTIFIED?
○ 1 HOUR
○ 1 DAY
○ 2 DAYS
○ OTHER

SUBMIT   CANCEL   VIEW CURRENT NOTIFICATIONS

FIG. 20

NOTIFY, ME EACH TIME:
FROM:           TO:
DATE: _____     DATE: _____
TIME: _____     TIME: _____

HOW SOON BEFORE EVENT DO YOU WANT TO BE NOTIFIED?
DAYS: _____
HOURS: _____
MINUTES: _____

ENTER    EXIT

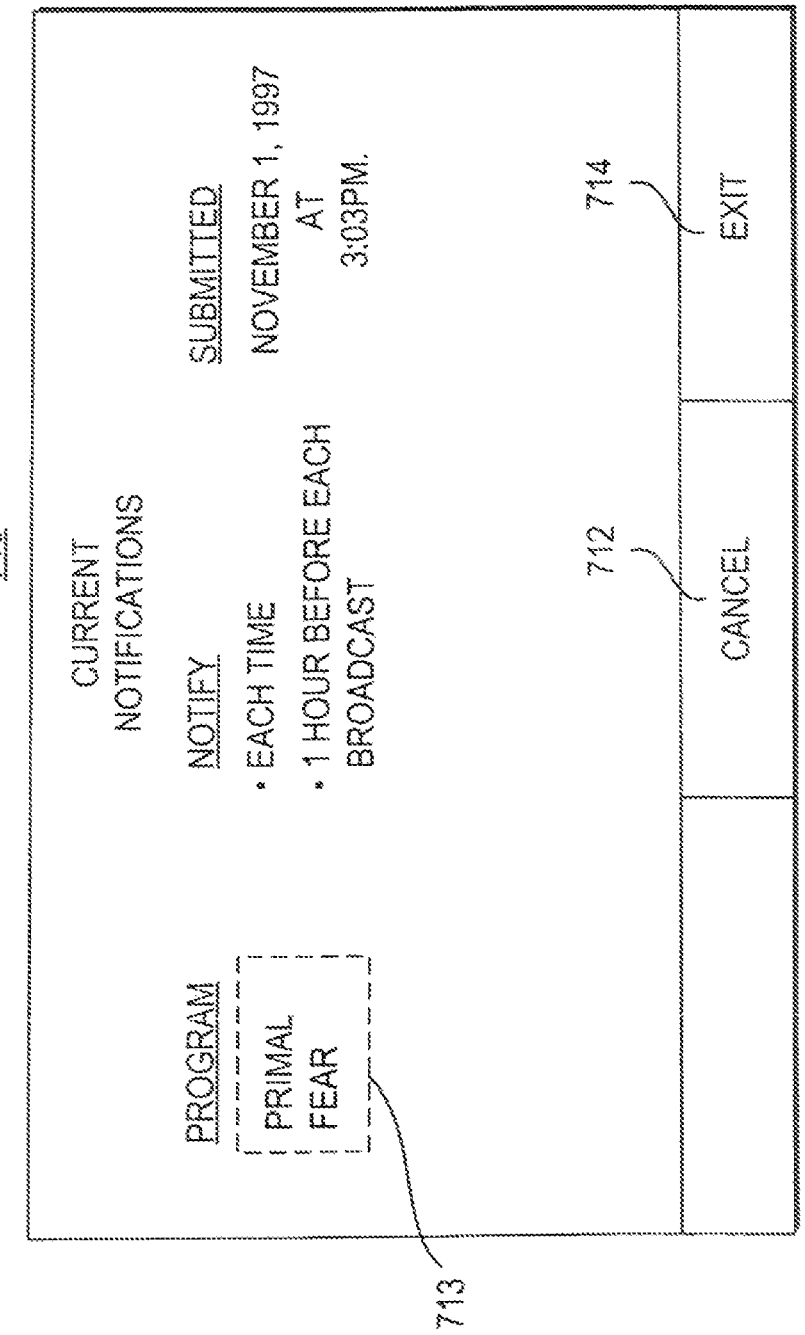

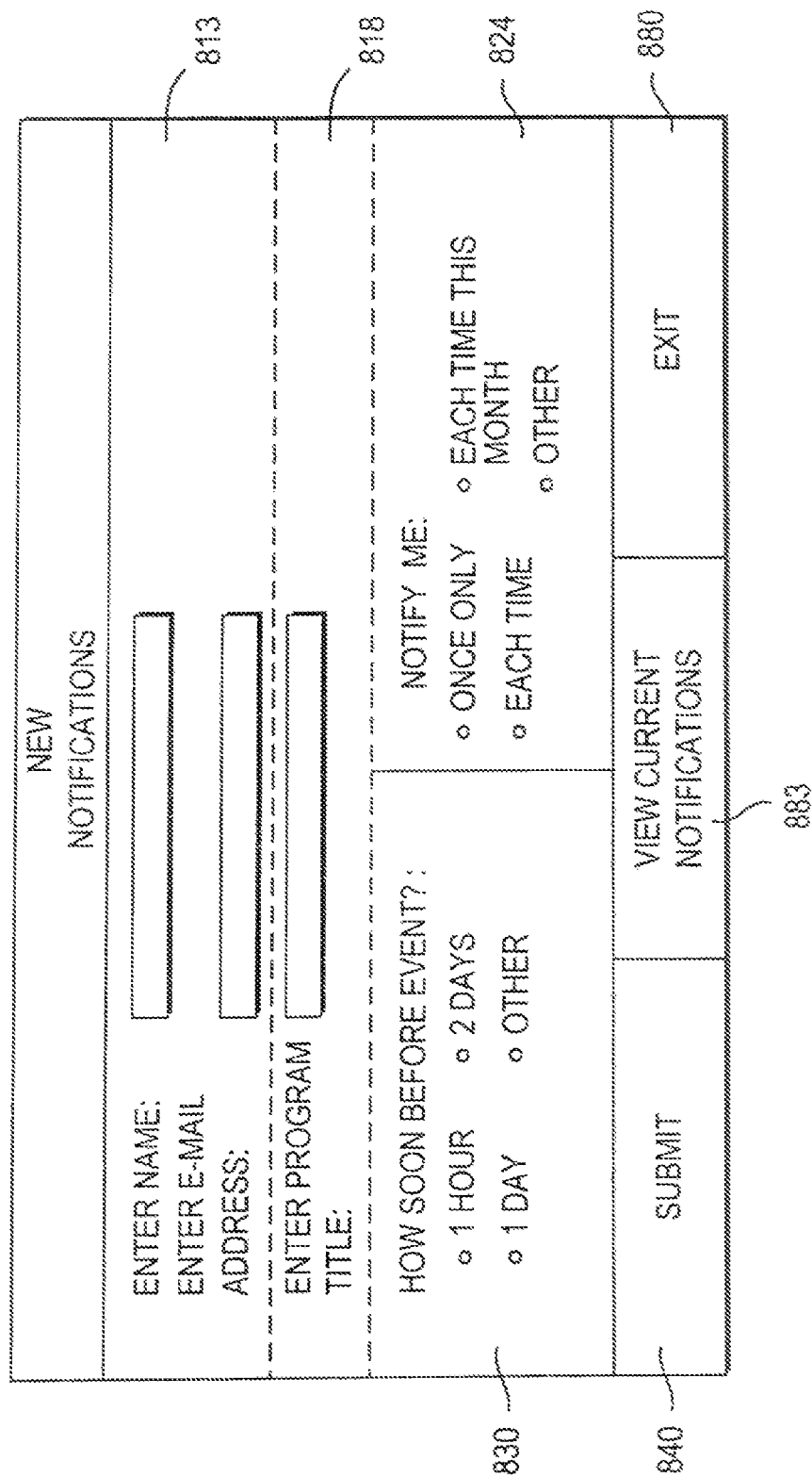

ELECTRONIC PROGRAM GUIDE WITH ADVANCE NOTIFICATION

CROSS REFERENCE TO RELATED APPLICATION

This application claims the benefit of U.S. patent application Ser. No. 09/378,533, filed Aug. 20, 1999, which claims the benefit of U.S. Provisional Application No. 60/097,504, filed Aug. 21, 1998. All these prior applications are hereby incorporated by reference in their entireties.

BACKGROUND OF THE INVENTION

This invention relates to program guide systems, and more particularly, to techniques for notifying a user of television programs.

Cable, satellite, and broadcast television systems provide viewers with a large number of television channels. Viewers have traditionally consulted printed television program listings to determine which programs were scheduled to be broadcast on a particular day and at a particular time. developed.

Recent technological advances have allowed more convenient and advanced program guide services to be developed. For example, passive television-based program guides have been developed that allow television viewers to view television program listings directly on their television sets. In addition, interactive television program guide services have been developed that allow a service provider to deliver television program listings data to a user's local set-top box. An interactive television program guide application in the set-top box allows the user to display television program listings on the user's television set. In known interactive program guide systems, the program listings data made available to a user are limited to a predetermined time frame of program listings.

Users may be interested in programs other than the programs in the available time frame of program listings. Such so-called non-frame television programs are those television programs which are outside the current display time frame. In contrast, in-frame television programs are those television programs which are inside the current display time frame. The current display frame for program guides is typically about two weeks or less, which is limited by the size of the program guide database that is maintained by the program guide. The frame can also be limited by the bandwidth for the distribution of the data and limited by the ability to collect accurate data (e.g., collected listings which are farther out in time can be less accurate). As an example of the category of non-frame television programs, consider movies presently showing in movie theaters but soon to be released on pay-per-view cable. Because cable customers are not provided with information that lets them know that the movie they are planning to see at the local movie theater will be available shortly on cable, cable companies stand to lose revenue to movie theaters. Similar problems exist for televised sporting events and the like.

Thus, users are still faced with the problem of tracking television programs that they desire to watch but which have not yet been scheduled (i.e., non-frame television programs).

It is therefore an object of the present invention to provide a way to notify users of upcoming television programs.

SUMMARY OF THE INVENTION

This and other objects of the invention are accomplished in accordance with the principles of the present invention by providing program guide notification methods and systems.

Users may be interested in programs which are not in a current program listings time frame of a program guide. For such programs, the program guide can provide a notification option. The notification option can provide the user with an opportunity to request that a notification to be received when a program of interest is determined to be in the current time frame. Notifications can be message notifications, reminder notifications, e-mail notifications, etc. The user can be provided with the opportunity to setup the parameters for notifications. The program guide can provide the user with the opportunity to view a list of notifications. Notifications can be set by selecting an advertisement for an upcoming program that is not presently in the current time frame, by entering a title of a program, by selecting a program from a coming soon display screen, etc. A notification can include information on the program for which the notification is being provided and can include user-selectable options. The program guide can monitor the user's notification requests to collect information that can be used in marketing, scheduling programs, advertising, etc.

According to one aspect of this invention, a method of providing interactive options for non-frame television programs on a display screen of a system (e.g., a television program guide system) is provided. The method includes: (1) presenting on the screen (e.g., a program guide screen) at least one option that corresponds to a non-frame television program, (2) allowing the user to select a first option, and (3) providing the user a service associated with the first option.

In another embodiment, an interactive method of notifying a user of non-frame television programs that are now in-frame for use with a system (e.g., a television program guide system) is provided. This method includes: (1) receiving non-frame data that corresponds to at least one non-frame television program, and (2) when the non-frame program is in-frame, notifying a user that the program will be broadcast in the current time-frame by providing the user with at least one interactive option that corresponds to the data.

In yet another embodiment according to this invention, a method for providing notifications of non-frame television programs to a user using a system (e.g., a television program guide system) is provided. The method includes: (1) allowing a user to specify a non-frame television program outside of the current display time frame, and (2) notifying the broadcast time to the user when the non-frame television program is now in the current time frame. In this embodiment, notification can be either non-interactive or interactive. In one non-interactive example, the method can involve sending a notification (or providing a notification order screen) with information regarding one or more selected non-frame television programs that are to be aired without a user-selectable option. In contrast, an interactive example might include a user-selectable option.

A coming soon program display screen can be provided according to this invention. Included on the coming soon program display screen are non-frame television programs which are outside the current display time frame.

If a user selects a program or a pay-per-view event that has not yet been included in the program listings of the current time frame, additional information related to the program or event can be displayed in a program information box. In addition to viewing this additional information on the program selected, the user can order a notification to notify the user when the selected program will be broadcast. Options can also be provided that allow the user to determine when notifications will be generated.

If desired, a notification can be set by directly entering the title of a television program for which notifications are desired.

As mentioned above, the user can also view a list of all currently requested notifications. If desired, information, such as the program name, type of notification, and the date and time the request was submitted can be displayed on the list for each notification. Entries can be added to the current notification list as soon as the user submits a new request. In addition, the user can cancel notification entries.

In yet a further aspect of the invention, electronic mail notifications can be set and generated based on other preferences which the user can specify.

Further features of the invention (including systems for implementing these methods), its nature and various advantages will be more apparent from the accompanying drawings and the following detailed descriptions of the preferred embodiments.

BRIEF DESCRIPTION OF THE DRAWINGS

FIG. 19 is a diagram of an illustrative notification screen that allows a user to enter information for ordering notifications in accordance with the present invention.

FIG. 20 is a diagram of an illustrative notification screen that allows the user to enter more specific information for ordering notifications in accordance with the present invention.

FIG. 22 is a diagram of an illustrative notification screen listing all current notification orders in accordance with the present invention.

FIG. 23 is a diagram of an illustrative notification screen that allows a user to enter a program title and to select among various options when ordering a notification in accordance with the present invention.

DETAILED DESCRIPTION OF THE PREFERRED EMBODIMENTS

Figure 1:
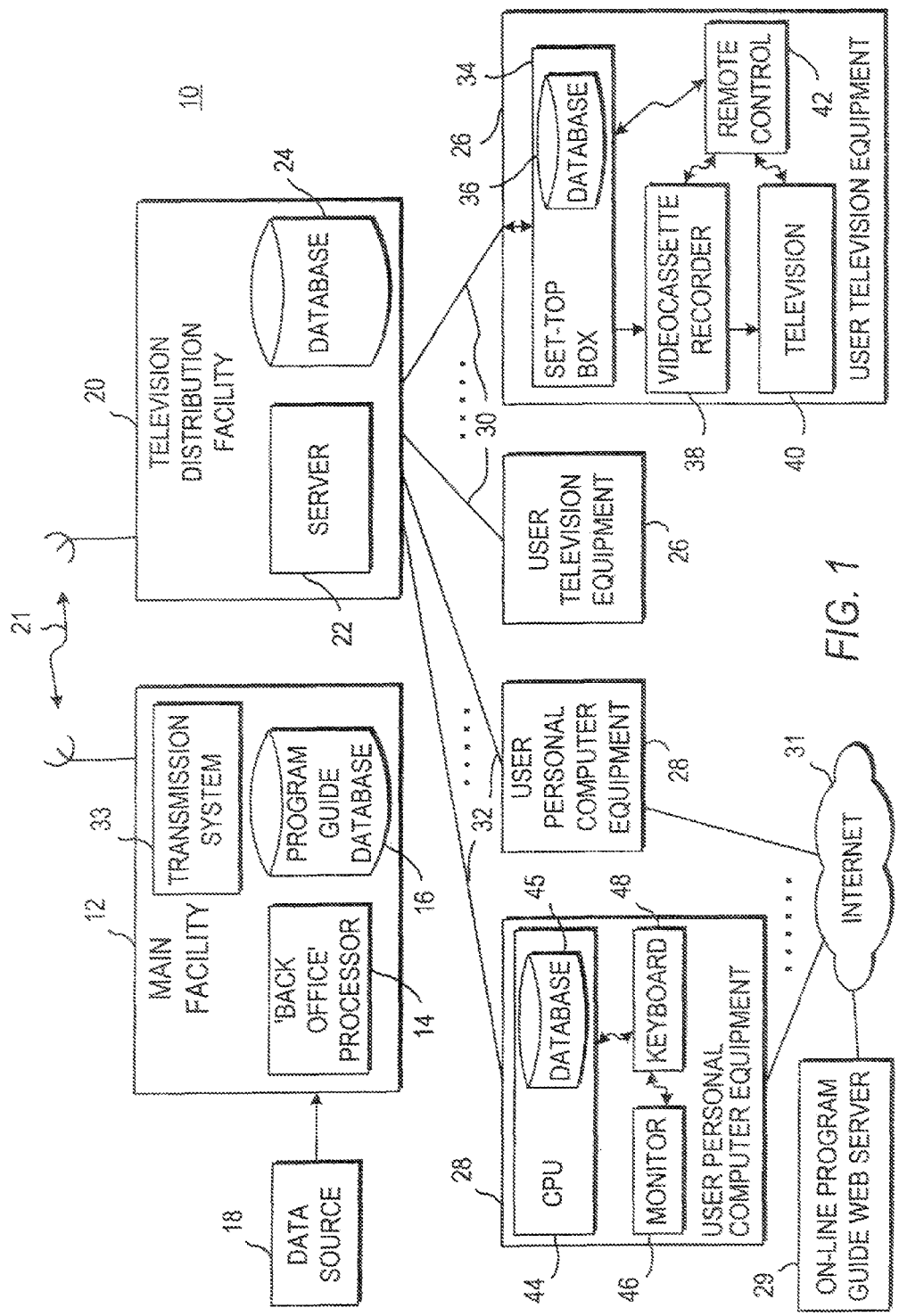
FIG. 1 is a diagram of an illustrative television program guide system in accordance with the present invention.

An illustrative interactive television program guide system 10 in accordance with the present invention is shown in FIG. 1. Main facility 12 can contain a back office processor 14 for organizing data, such as television program guide listings data, as will be described in greater detail below. Main facility 12 can also contain a program guide database 16 for storing program guide information, pay-per-view ordering information, television program promotional information, etc. Some of the information stored in database 16 can be from an external data source 18. Back office processor 14 is used to process the information stored in database 16.

Information from database 16 can be transmitted to multiple television distribution facilities, such as television distribution facility 20 via communications links, such as communications link 21. Only one television distribution facility is shown in FIG. 1 to avoid over-complicating the drawings. Each Link 21 can be a satellite link, a telephone network link, a cable or fiber optic link, a microwave link, a combination of such links, or any other suitable communications path. If it is desired to transmit video signals over link 21 in addition to data signals, a relatively high bandwidth link, such as a satellite link is generally preferable to a relatively low bandwidth link, such as a telephone line.

Television distribution facility 20 is a facility for distributing television signals to users. Television distribution facility 20 can be, for example, a cable system headend, a broadcast distribution facility, a satellite television distribution facility, or any other suitable distribution facility.

The program guide information transmitted by main facility 12 to television distribution facility 20 includes television program listings data for current and future television programs. The television program listings data for each program preferably includes numerous program characteristics, e.g., the title of the program, the channel for the program, a scheduled broadcast time (start time) and an ending time (or duration). Other typical program characteristics include ratings, critics ratings, descriptions, categories (sports, movies, comedy, children, etc.), actors, etc. Transmitted program information can also include advertising information and pay program data, such as pricing information for individual programs and subscription channels, time windows for ordering programs and channels, telephone numbers for placing orders that cannot be impulse ordered, etc.

Television distribution facility 20 distributes television programming and program guide information to the user television equipment 26 or the user personal computer (PC) equipment 28 of multiple users via communications paths 30 and 32, respectively. PC equipment 28 is based on a central processing unit (CPU) 44 and can have a monitor 46 and keyboard 48. User television equipment 26 is based on a set-top box 34 and can have optional videocassette recorder 38, television 40, and remote control 42.

Various techniques can be used to distribute television programming and program guide information. For example, television programming can be distributed over analog television channels and program guide data can be distributed over an out-of-band channel on paths 30. Data distribution can also involve using one or more digital channels on paths 30 and 32. Such digital channels can also be used for distributing television programming and other information. Multiple television and audio channels (analog, digital, or both analog and digital) can be provided to set-top boxes 34 and PC equipment 28 via communications paths 30 and 32. In user television equipment 26, television programs can be tuned to by user's set-top box 34 and can be displayed by television 40. In user PC equipment 28, a video board or other such component can be used to tune to a television program, and the television program can be displayed on monitor 46. Program listings and other information can be distributed via communications paths 32 to PC equipment 28, which can have a cable modem or other such communications device for receiving or transmitting data. In addition, program listings and other data can be distributed by one or more distribution facilities that are similar to but separate from television distribution facility 20 using communications paths that are separate from communications paths 30 and 32. If desired, data from the main facility 12 can be distributed to PC equipment 28 over the Internet or other suitable communications path that does not involve the use of television distribution facility 20. In some configurations, program guide functions are provided in the form of an on-line program guide by using PC equipment 28 to access a web server, such as web server 29 over the Internet 31 or other such data network.

The program guide system can use a client-server architecture whether or not the system involves use of the Internet. In a client-server arrangement, the program guide is partially implemented on a server and partially implemented on a client. The server can be a server, such as server 22 located at, for example, television distribution facility 20. Processors in the user equipment, such as set-top box 34 or CPU 44, can act as the client processors. Program guide data that are distributed to a client-server program guide at television distribution facility 20 can be stored in a database 24 at television distribution facility 20 that is maintained by server 22. For clarity, the present invention is described primarily in the context of an interactive television program guide that is implemented on user equipment using a set-top box 34 or CPU 44 that receives data from television distribution facility 20, rather than in the context of program guides that are implemented using an on-line program guide configuration, are implemented partially on a server and partially on user equipment, or are implemented using any other such arrangements.

Certain functions, such as pay program purchasing can require set-top boxes 34 to transmit data to television distribution facility 20 over communications paths 30. If desired, such data can be transmitted over telephone lines or other separate communications paths. If functions, such as these are provided using facilities separate from television distribution facility 20, some of the communications involving set-top boxes 34 can be made directly with the separate facilities.

User television equipment 26 has a receiver, which is typically a set-top box, such as set-top box 34, but which can be other suitable television equipment into which circuitry similar to set-top box circuitry has been integrated. For example, user television equipment 26 can be based on an advanced television receiver, such as a high definition television ("HDTV") receiver. Program guide data can be distributed to set-top boxes 34 periodically or continuously and stored in database 36. In a client-server architecture, this database need not be maintained on the set-top box and may be distributed over a number of different locations. For example, the program guide can maintain a database, such as database 24, using a server, such as server 22 located at television distribution facility 20 or at some other appropriate location or locations. Television distribution facility 20 can poll set-top boxes 34 periodically for certain information (e.g., pay program account information or information regarding programs that have been purchased and viewed using locally-generated authorization techniques).

Main facility 12 preferably contains a processor to handle information distribution tasks. Each set-top box 34 preferably contains a processor to handle tasks associated with implementing a program guide application on the set-top box 34. User PC equipment contains CPU 44 to handle tasks associated with implementing a program guide application. Television distribution facility 20 can contain a processor for tasks associated with monitoring a user's interactions with the interactive program guides implemented on user PC equipment 28 and user television equipment 26 and for handling tasks associated with the distribution of program guide data and other information to user PC equipment and user television equipment 26. Moreover, the processor of television distribution facility 20 can be used to support the server functions of a client-server program guide.

In user television equipment 26, videocassette recorders 38 or other suitable recording devices allow selected television programs to be recorded. Each videocassette recorder 38 is connected to a respective television 40. To record a program, set-top box 34 tunes to a particular channel and sends control signals to videocassette recorder 38 (e.g., using an infrared transmitter) that direct videocassette recorder 38 to start and stop recording at the appropriate times.

During use of the interactive television program guide implemented on set-top box 34, television program listings and other information can be displayed on television 40. Such program guide displays can be presented as an overlay on top of a television program to which the user has tuned with set-top box 34 or can be presented in place of such a program. Each set-top box 34, videocassette recorder 38, and television 40 can be controlled by one or more remote controls 42 or any other suitable user input interface, such as a wireless keyboard, mouse, trackball, dedicated set of buttons, touch screen display remote, etc. Remote controls, such as remote control 42, have various buttons that can be pressed by the user such as arrow keys (for directing on-screen movement of a highlight region, scrolling functions, etc.), an OK, select, enter, or other such selection key for making a selection (hereinafter referred to as an OK key), channel number keys (for selecting a television channel), a favorites key (to invoke functions related to user preferences), a delete key (to delete menu items or to express a disinterest in certain user preferences), etc.

PC equipment, such as PC equipment 28, is based on a CPU 44 that maintains a database 45. A program guide implemented on PC equipment 28 can be used to access and display program guide information on monitor 46. User selections and inputs can be made by a keyboard 48, mouse, trackball, or other PC input devices. It is understood that the following discussion, although directed to user television equipment and set-top boxes, is applicable to program guides used in connection with PC equipment.

Notification can be presented in a number of ways, such as "on-screen," "on-line," etc. As used herein, "on-line" notification includes notifications transmitted, at least in part, using the Internet. "On-screen" notification includes notifications transmitted to user-television equipment. "On-screen" and "on-line" notification methods are not mutually exclusive. For example, a notification can take the form of an electronic mail message "e-mail" that was transmitted via the Internet and displayed on user television equipment.

Figure 2:
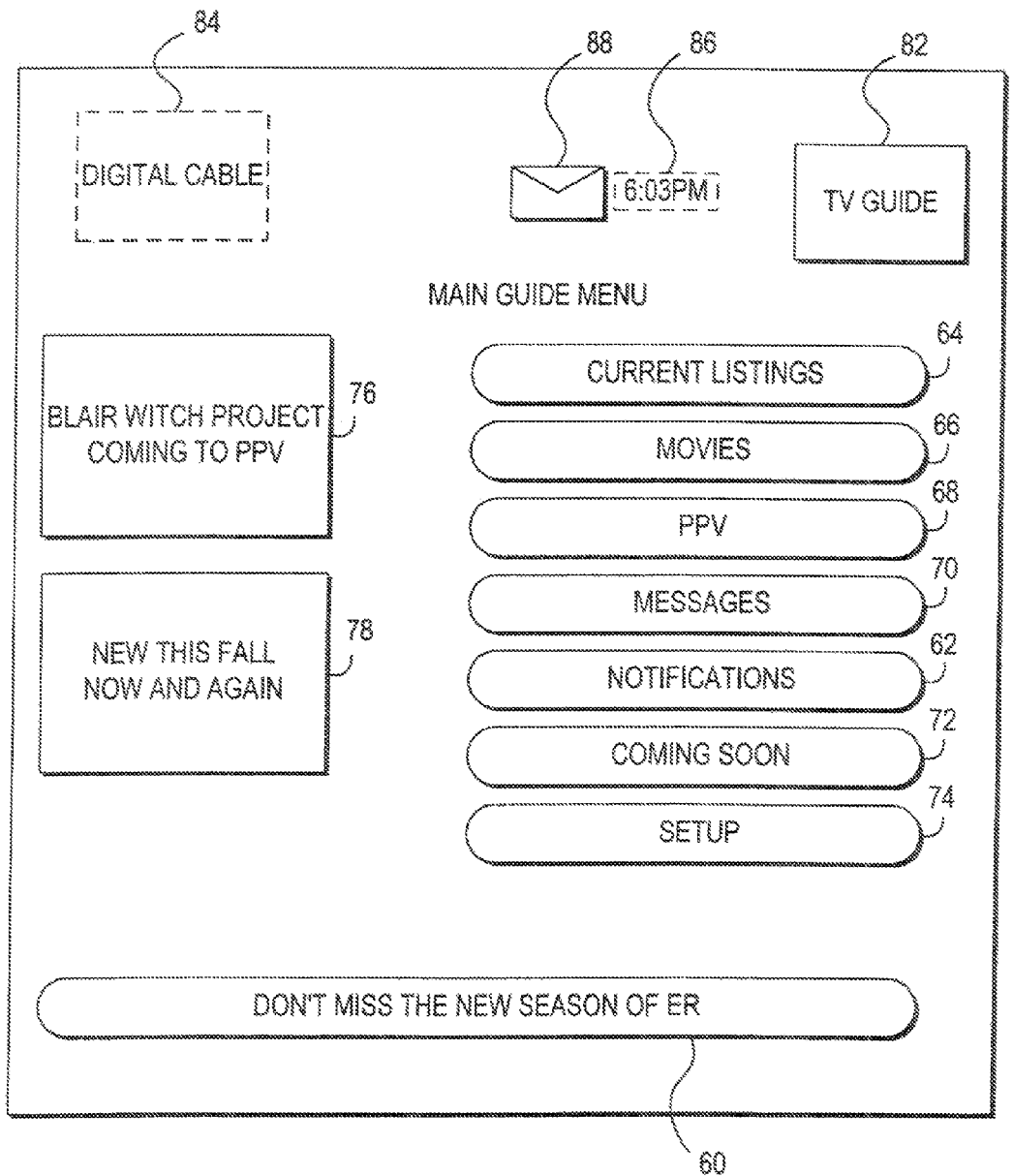
FIG. 2 is a diagram of an illustrative main program guide menu display screen in accordance with the present invention.

A program guide display screen can include a notifications option. For example, as shown in FIG. 2, illustrative main program guide menu display screen 60 can include notifications option 62 and six other options (current listings option 64, movies option 66, Pay-per-view option 68, messages option 70, coming soon option 72, and setup option 74). In addition, display screen 60 can include brand logo 82, system operator logo 84, current-time display portion 86, new message indicator 88, and advertisements 76, 78, and 80.

Brand logo 82 can identify the brand of the interactive program guide (e.g., TV Guide). System operator logo 84 can identify the brand of the system operator. Current-time display portion 86 can contain the current time of day. New message indicator 88 can indicate that there are messages available.

A program guide user can select an option by, for example, navigating a highlight region on a selectable option and pressing a data entry key, such as an OK key of a remote control.

A notification option can be available for programs that are not in the current program listings time frame of the program guide. Such out-of-time-frame programs (i.e., non-frame programs) can include programs that are not in the current time frame of the program guide, but are in a schedule stored at a main facility. Such non-frame programs can further include unscheduled programs that have related information at the main facility indicating that they are coming soon (e.g., movies in current cinematic release, new series that have been announced but not yet scheduled, returning series which have not yet been scheduled, special events, etc.). Such non-frame programs can further include programs that the user can know of but for which the main facility has no available information.

The program guide system can store a list of programs which are not in the current time frame but have been scheduled or which are upcoming programs that have not yet been scheduled. The list can be stored at a main facility, at a server at a television distribution facility, or at user television equipment. When a user is provided with the opportunity to enter a title for a program (see below), the list can be searched for programs matching the entered title. The search can occur at the location where the list is stored. As programs move into the current program guide time frame, the comparison between the database programs in the current program guide time frame and programs in the user's notifications list can take place at any of those locations (e.g., main facility, server, or user television equipment).

For programs that are already in the current time frame of a program guide, a notification can not be available, although a reminder option can be available.

Figure 3:
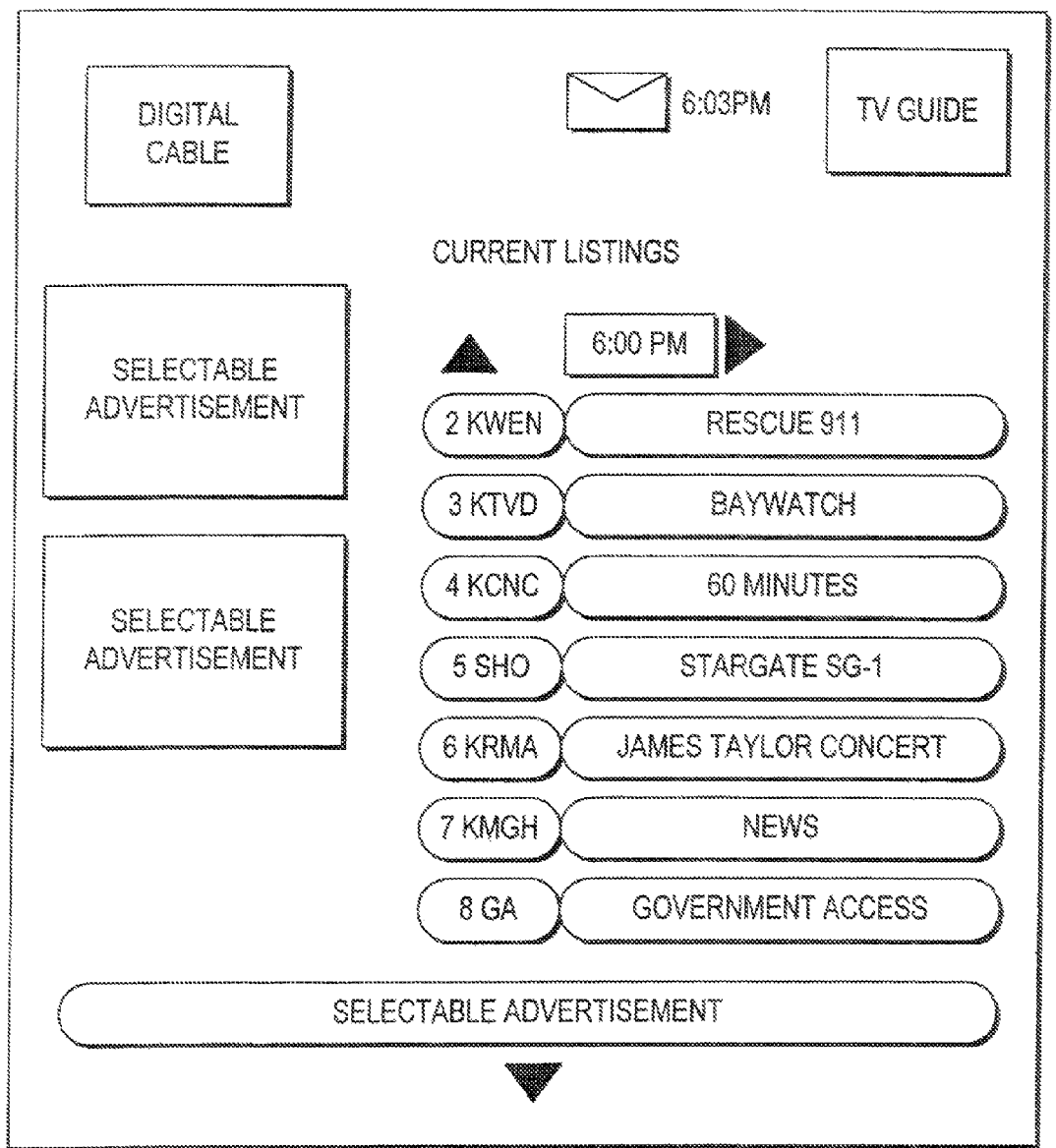
FIG. 3 is a diagram of an illustrative current listings display screen from which the program listings in the current time frame can be available in accordance with the present invention.

When a user selects current listings option 64, the program guide can display a current listings display screen, such as illustrative current listings display screen 96 of FIG. 3. From the current listings display screen 96, the program guide can provide the user with the opportunity to view a time versus channel listing of programs. The display 96 can provide the user with the opportunity to view and act on the program listings for the current time frame (e.g., one week, two weeks, etc.). The program guide can retrieve the program listings for the current time frame from a local database (e.g., database 24 or 36 of FIG. 1).

When a user selects movies option 66 or pay-per-view option 68, the program guide can display a listings display screens for the current time window of movies or pay-per-view programs. Each listings display screens can have a format which is similar to illustrative current listings display screen 96. It is to be understood that the format for display screen 96 is illustrative and other formats for listings display screens can be employed.

Figure 4:
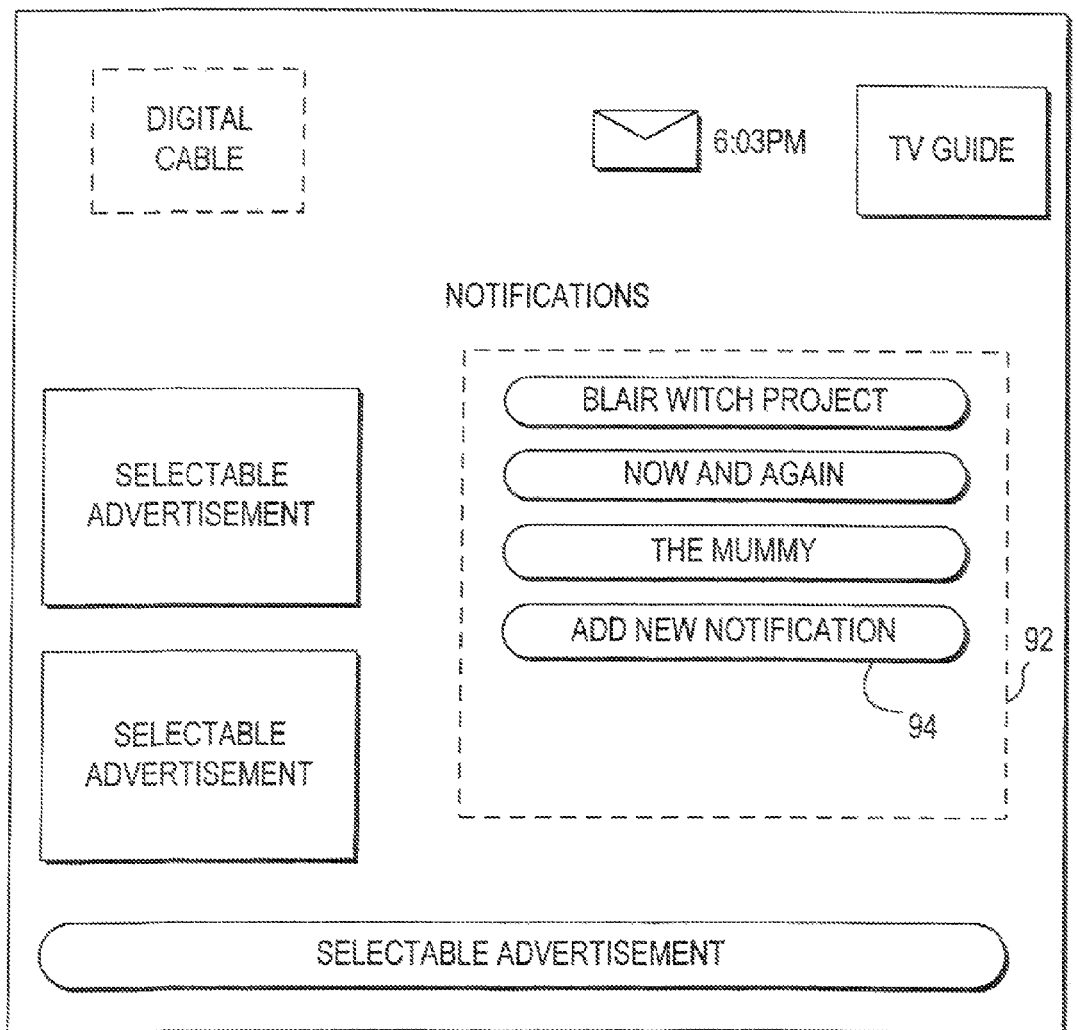
FIG. 4 is a diagram of an illustrative notifications display screen which can provide an illustrative notifications list in accordance with the present invention.

When a user selects a notification option, such as notifications option 62 of FIG. 2, the program guide can display illustrative notifications display screen 90 of FIG. 4. Display screen 90 can include list 92 of notifications that the user has previously set (e.g., notifications for the Blair Witch Project, Now and Again, and the Mummy). The program guide can provide the user with the opportunity to select any one of the displayed notifications in order to delete or modify the selected notification. An add new notification option, such as option 94, can provide the user with the opportunity to add a new notification to the list. The add new notification option can be contained in list 92 or can be in another suitable position on display screen 90.

Figure 5:
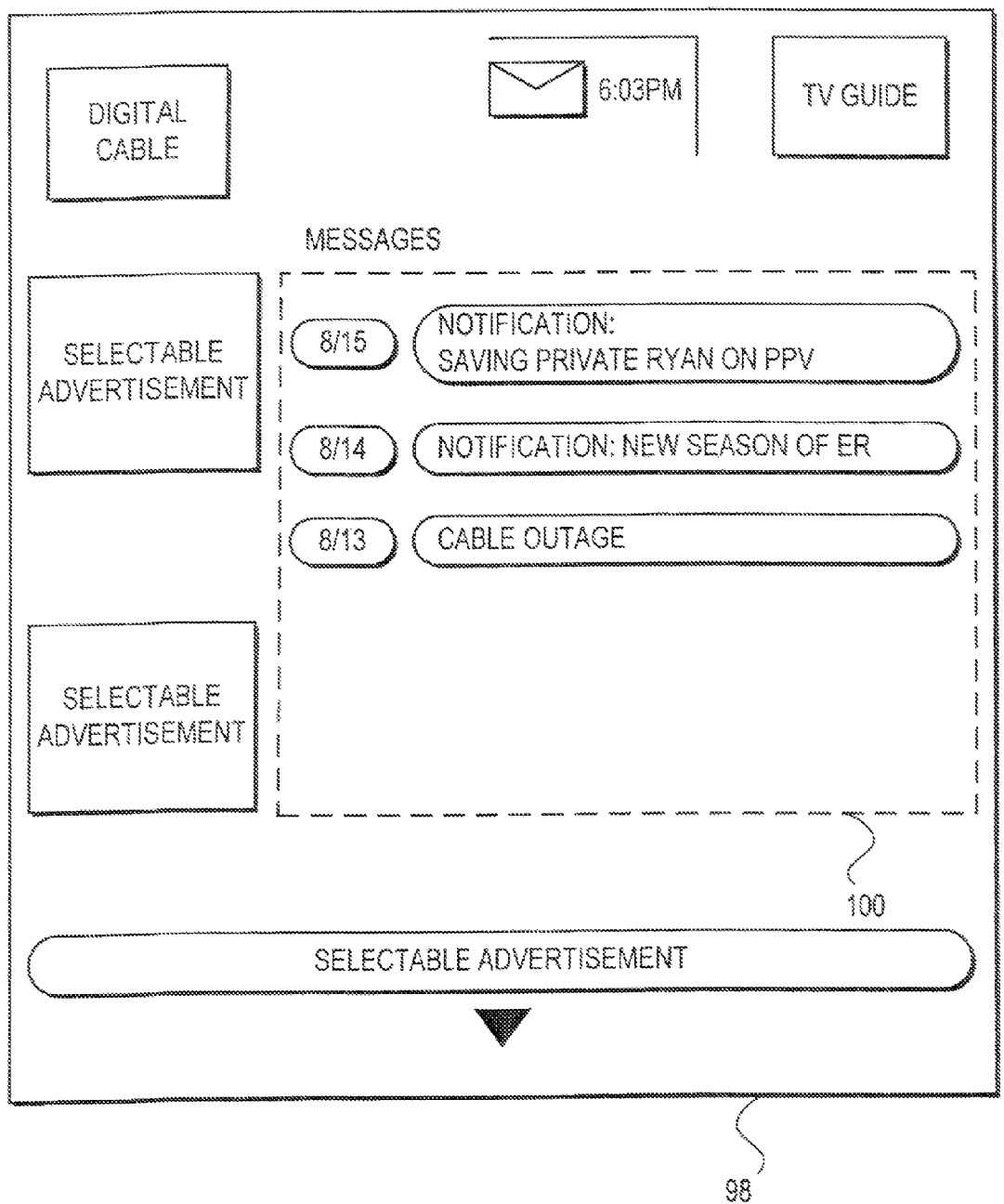
FIG. 5 is a diagram of an illustrative messages display screen which can include a list of messages in accordance with the present invention.

When a user selects a messages option, such as messages option 70 of FIG. 2, the program guide can display a messages display screen, such as illustrative messages display screen 98 of FIG. 5. Display screen 98 can include a list of messages 100. The list 100 can include all messages that have been sent to this user's household. List 100 can include notification messages (e.g., the first two messages in list 100). Other types of messages can be included in list 100, such as a message for informing the user of a cable outage. A user can select a message from list 100 by navigating a highlight region on an item in the list and pressing a data entry key, such as an OK key of a remote control.

Figure 6:
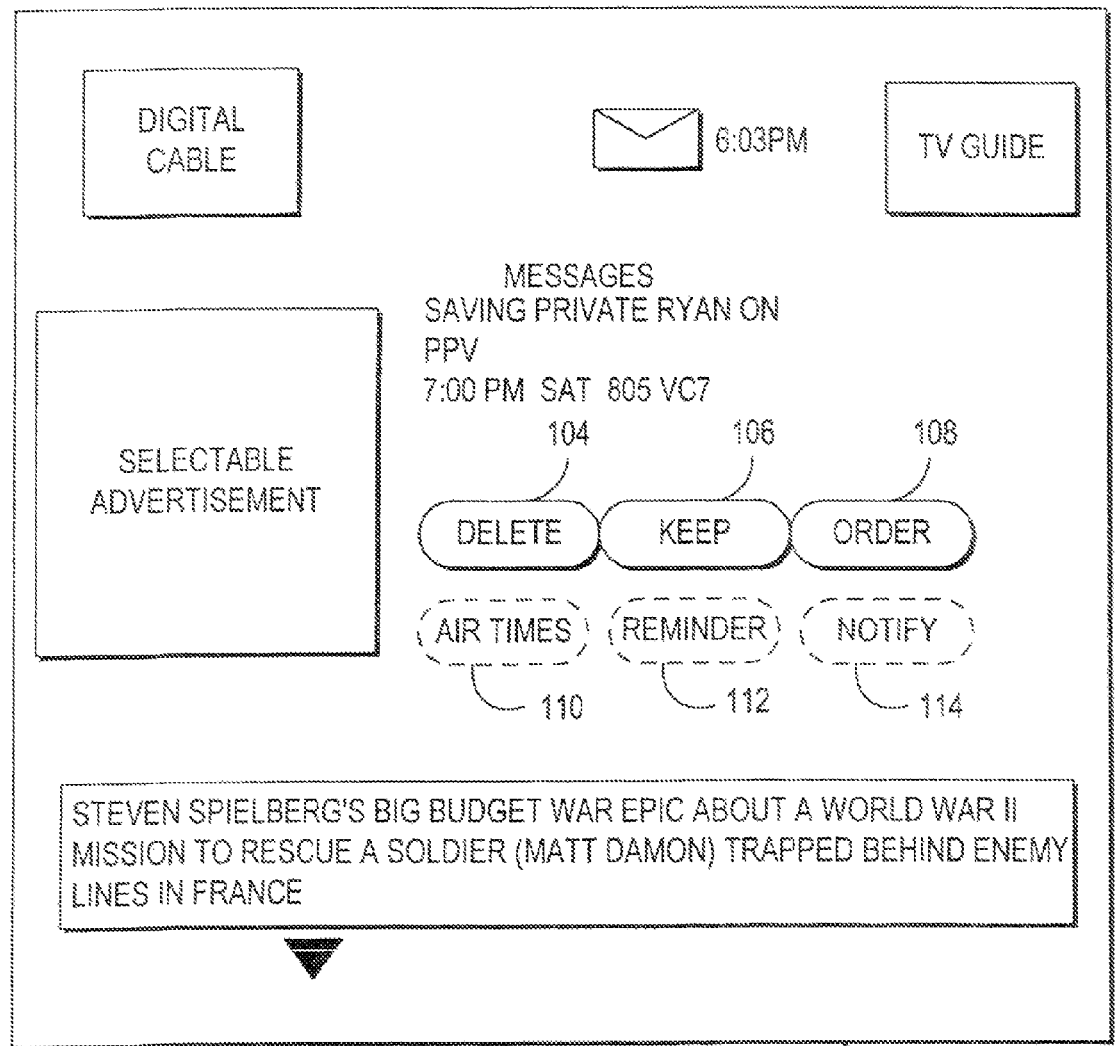
FIG. 6 is a diagram of an illustrative message display screen in accordance with the present invention.

When a user selects a message from list 100, the program guide can display a message display screen, such as message display screen 102 of FIG. 6. When the selected message is a message other than a notification message, the program guide can display the message title, message text, and the option to keep or delete the selected message. When the selected message is a notification message, the program guide can display the program title as the message title and the program description as the message text. For a notification message, the program guide can display the scheduled time and channel for the program. The program guide can also display options which are related to the program. For example, the program guide can display order option 104, keep option 106, delete option 108, air times option 110, and reminder option 112. When the notification message is for a pay-per-view program, order option 104 can be displayed to provide the user with the opportunity to impulse order the program. When reminder option 112 is selected, the program guide can provide the user with the opportunity to set a reminder for the program. When air times option 110 is selected, the program guide can provide the user with the opportunity to view a list of broadcast times. When keep option 106 is selected, the program guide can keep the message for future reference by the user, and when delete option 104 is selected, the program guide can delete the message. The program guide can determine which options can be displayed based on the program for which the notification message was received. For example, when the selected program is a pay-per-view program, order option 108 can be displayed. Air times option 110 can be displayed when there is more than one show time for the program.

A message can have been sent to users to announce to users that a program is coming soon (e.g., an e-mail advertisement for a future program which is not in the current time frame). For such messages, the program guide can display notify option 114. The time and channel of the program can not be displayed in the message since the program is not yet listed in the current time frame of the program guide. When the notify option 114 is selected for a program that is not currently listed, the program guide can provide the user with the opportunity to set a notification for that program.

Figure 7:
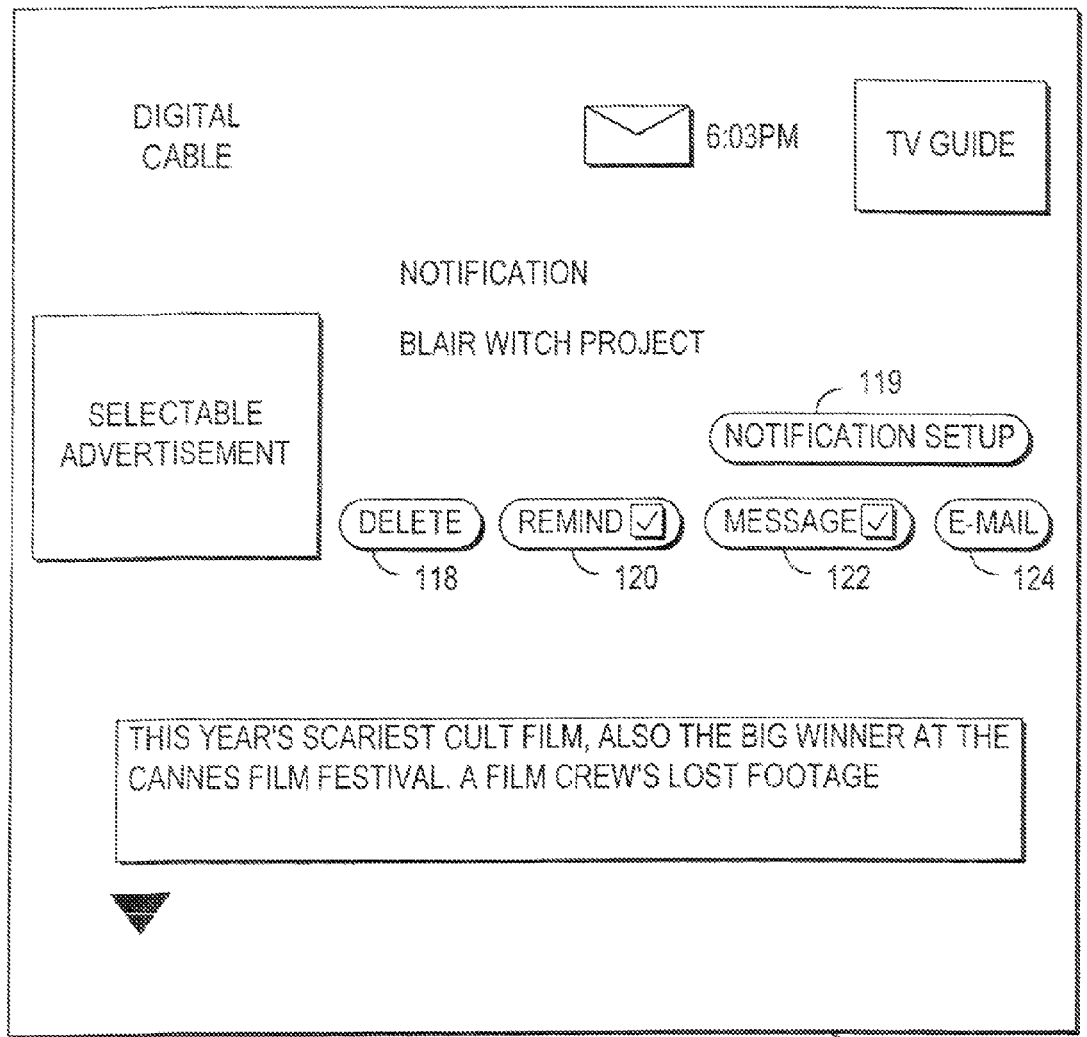
FIG. 7 is a diagram of an illustrative notification display screen in accordance with the present invention.

For example, as shown in FIG. 7, when the user selects a notify option for a program that is not within the current time-frame of the program guide, the program guide can display a notification display screen, such as illustrative notification display screen 116 of FIG. 7. A notification display screen, such as illustrative notification display screen 116, can be displayed under certain other circumstances. For example, when a user selects an advertisement for a program that is not listed in the current time frame, the program guide can display notification display screen 116. Also, when a user selects a program from a coming soon display screen (discussed below), the program guide can display notification display screen 116. Moreover, when a user selects a program from a notifications display screen (e.g., notifications display screen 90 of FIG. 4), the program guide can display notification display screen 116 to provide the user with the opportunity to modify or delete that notification.

Notification display screen 116 can include the title of the program and a description of the program. When a user has set a notification by entering a title of a program (discussed below) and a description is not yet available for that program, the program guide can simply display a description that is blank. Notification display screen 116 can include user-selectable options. For example, notification display screen 116 can include delete option 118, remind option 120, message option 122, and e-mail option 124.

When delete option 118 is selected, the program guide can delete the notification. The types of notification desired can be specified with user-selectable options, such as remind option 120, message option 122, and e-mail option 124. The program guide can display a status indicator (e.g., a checkmark) in remind, message, and e-mail options 120, 122, and 124 to indicate that the user has already selected a notification of this type for the program.

Figure 8:
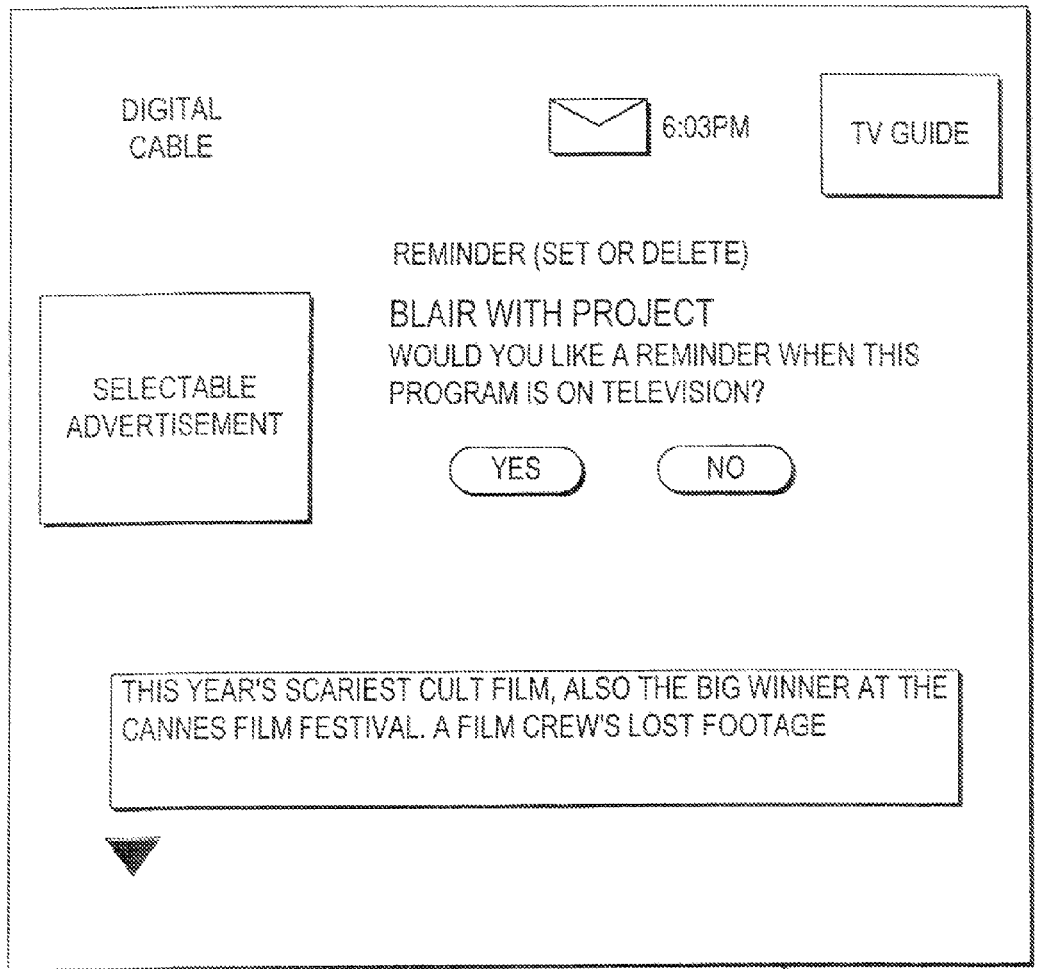
FIG. 8 is a diagram of an illustrative reminder display screen in accordance with the present invention.

When a user selects a remind option, such as remind option 120 of FIG. 7, the program guide can display a reminder display screen, such as reminder display screen 126 of FIG. 8. Display screen 126 can provide the user with the opportunity to confirm the setting of a reminder for the upcoming program. When a remind option is selected for a program that a reminder notification has already been set, the program guide can provide the user with an opportunity to delete the reminder.

Figure 9:
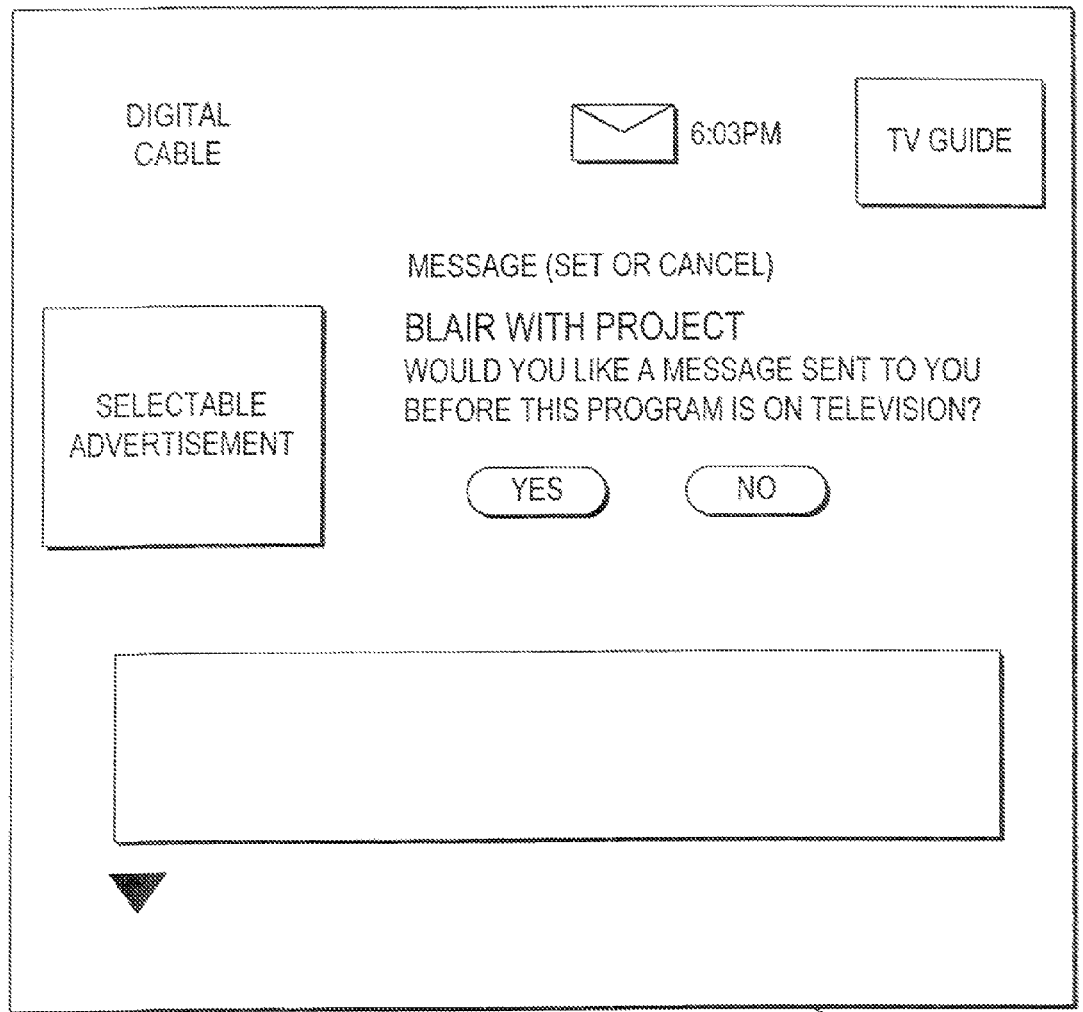
FIG. 9 is a diagram of an illustrative set message display screen in accordance with the present invention.

When a user selects a message option, such as message option 122 of FIG. 7, the program guide can display a set message display screen, such as set message display screen 128 of FIG. 9. Display screen 128 can provide the user with the opportunity to confirm that a message should be sent to the user's household when the program is scheduled (e.g., when the upcoming program is now determined to be scheduled to be displayed during the current time frame). When the message option (e.g., message option 122 of FIG. 7) is selected for a program for which the message option has already been set, the program guide can query the user to determine whether the message should be canceled.

Figure 10:
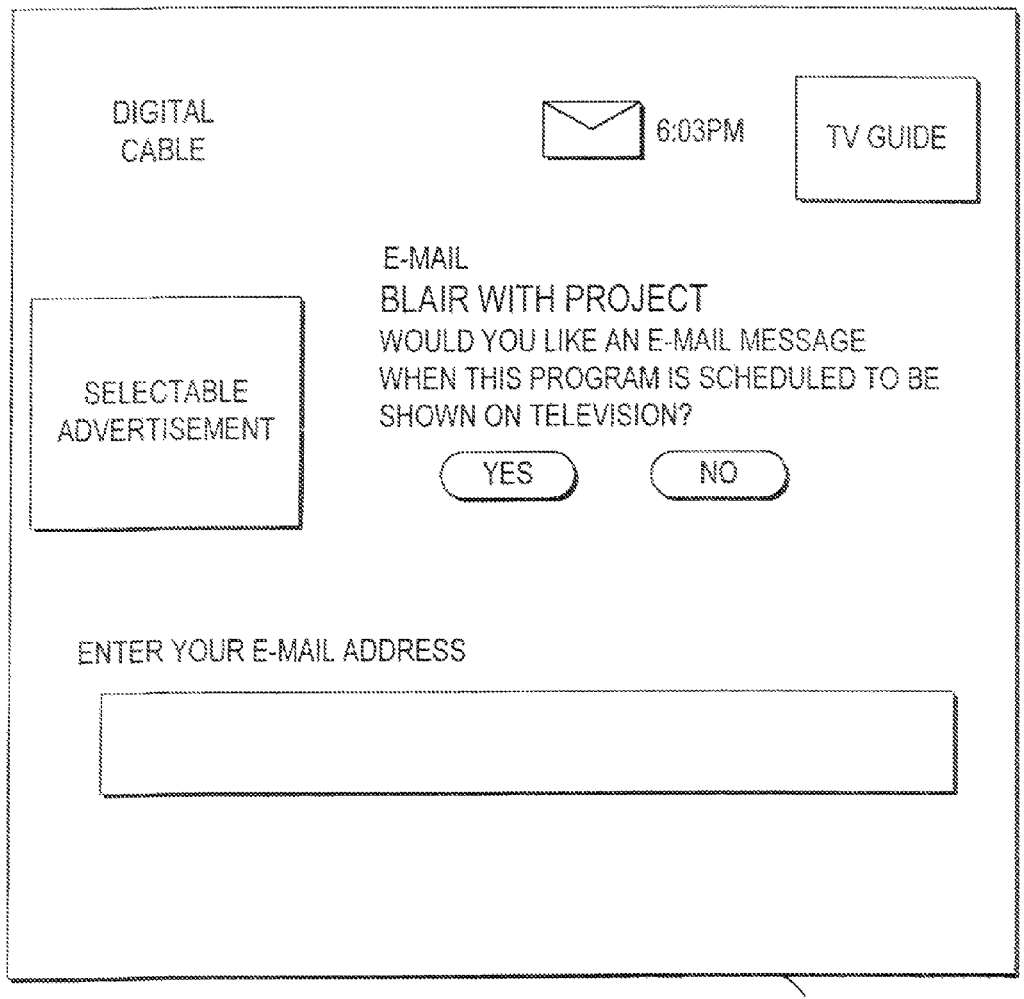
FIG. 10 is a diagram of an illustrative e-mail display screen in accordance with the present invention.

When a user selects an e-mail option, such as e-mail option 124 of FIG. 7, the program guide can display an e-mail display screen, such as e-mail display screen 130 of FIG. 10. E-mail display screen 130 can provide the user with the opportunity to select to have an e-mail notification sent to the user's e-mail address. E-mail display screen 130 can provide the user with the opportunity to enter an e-mail address. Depending on the program guide system arrangement, an e-mail address can be entered with a remote control, a keyboard, a display remote, etc. If desired, a setup display screen, discussed below, can provide the user with the opportunity to enter an e-mail address which would then be applied to all e-mail notifications. When an e-mail option (e.g., e-mail option 124 of FIG. 7) is selected and the user had already set an e-mail option earlier to receive an e-mail notification, the program guide can provide the user with the opportunity to delete the e-mail notification.

As discussed above, when a user selects an advertisement for a non-frame program, the program guide can display a notification display screen, such as notification display screen 116 of FIG. 7. For example, a user can select interactive advertisements 76, 78, and 80 of FIG. 2, which are for programs that are not yet available in the current time frame of the program guide. As shown in FIG. 2, advertisement 76 can be for the Blair Witch Project, which is a future program that is coming to pay per view. Advertisement 78, an advertisement for Now and Again, can be for a new program to air in the fall television season which is now being advertised in the summer season. Advertisement 80 can be an advertisement for the upcoming new season of the E.R. television program which can commence in the next time frame. When a user selects any one of the three advertisements 76, 78, and 80, the program guide can display a notification display screen, such as notification display screen 116 of FIG. 7.

Figure 11:
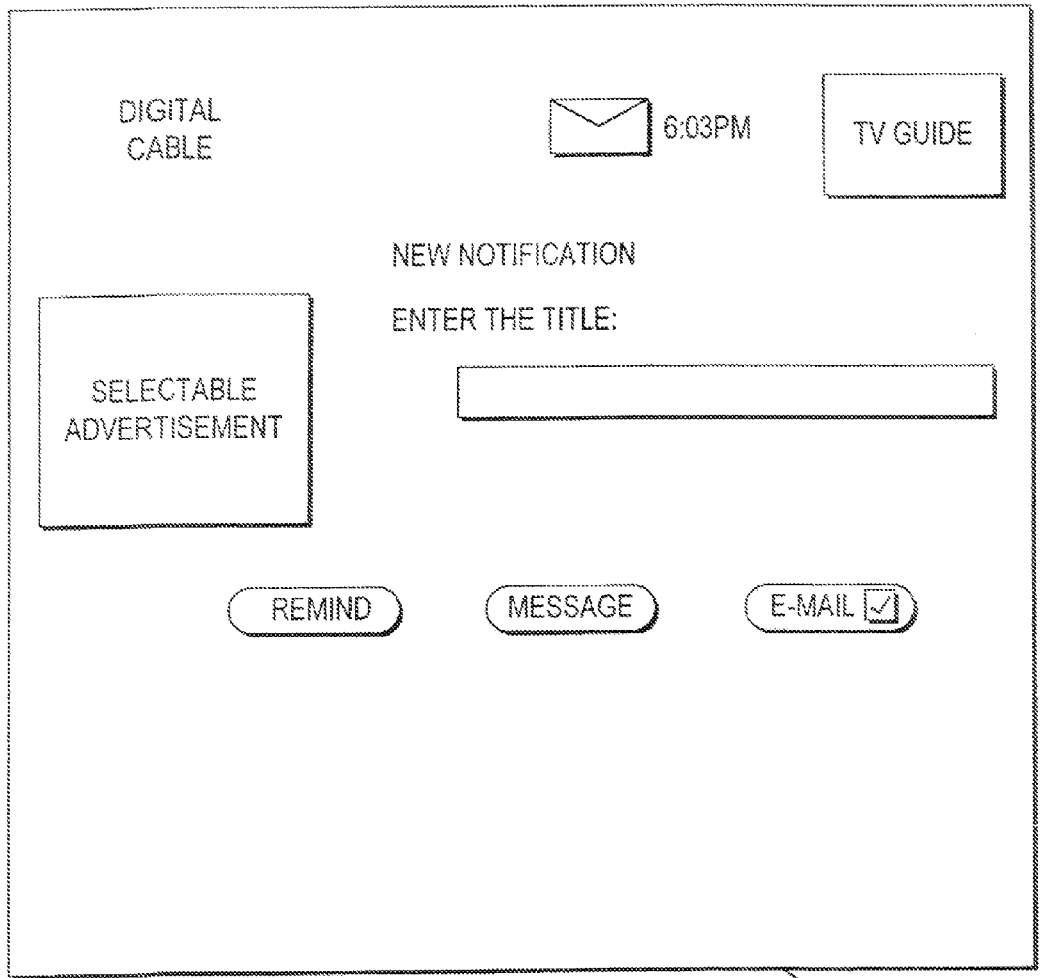
FIG. 11 is a diagram of an illustrative new notification display screen in accordance with the present invention.

When a user selects an add-new-notification option, such as add-new-notification option 94 of FIG. 4, the program guide can display a new notification display screen, such as new notification display screen 132 of FIG. 11. Display screen 132 can provide the user with the opportunity to enter the title of a program for which the user desires to receive a notification. The title can be entered with a remote control, keyboard, a display remote, or another suitable data entry interface. When a title is entered, the title can be added to a notification list, such as notification list 92 of FIG. 4. The title can be added without a description. The program guide can determine whether the title for the program is in the current time frame, which can be stored in a local database of the program guide or at a remote server. When there is a match, the program guide can retrieve the matching information (e.g., program description). Display screen 132 can include options for providing the user with the opportunity to specify the types of notification desired (e.g., remind, message, e-mail, etc.).

Figure 12:
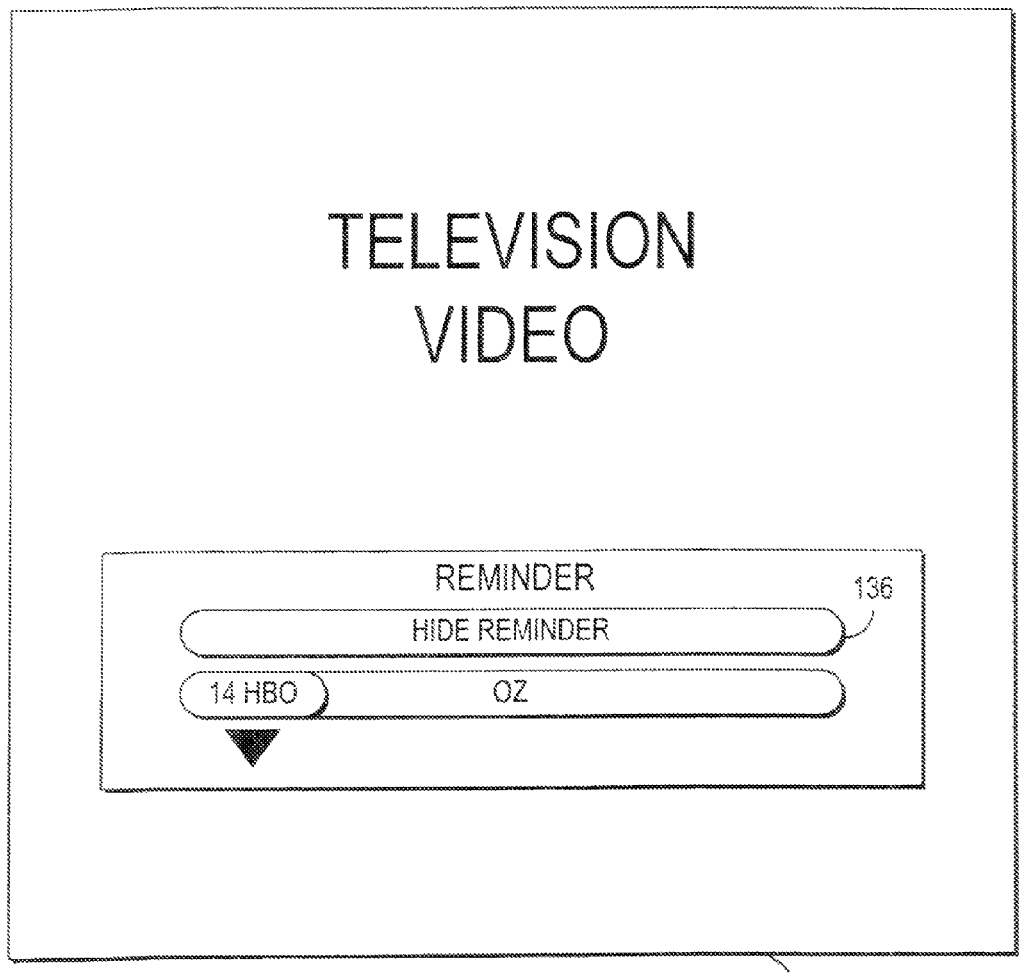
FIG. 12 is a diagram of an illustrative reminder list display screen in accordance with the present invention.

After a user has set reminders for upcoming programs, the program guide can display a reminder list display screen, such as reminder list display screen 134 of FIG. 12. The program guide can automatically display reminder list display screen 134 shortly before the start of the upcoming program. Display screen 134 can include an overlay containing a list of reminders which have been set by the user. The overlay can be displayed on top of the video for the program that the user is currently watching. Display screen 134 can include a hide reminder option 136. When the user selects hide reminder option 136, the program guide can remove the overlay and return the user to viewing the current program. When the user selects a specific program in the list, the program guide can tune immediately to the channel showing that program. The program guide can provide the user with the opportunity to view the reminder list at any time until the listed programs end. The opportunity to selectively view the reminder list at any time can, for example, be provided by providing a predetermined key on a remote control. The list can include reminders other than notification reminders (e.g., reminders set for other features of the program guide), which can have been configured with a different configuration setup than for notification reminders.

Figure 13:
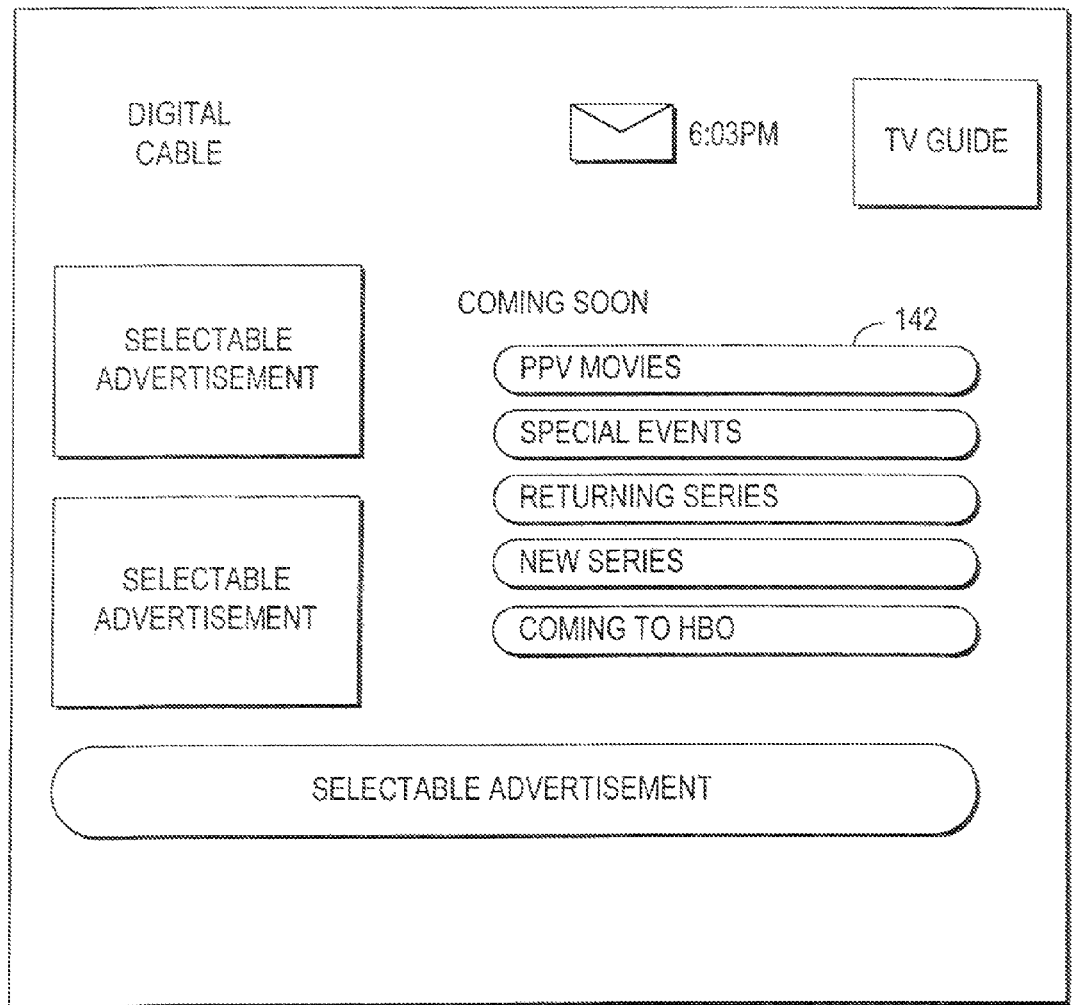
FIG. 13 is a diagram of an illustrative coming soon display screen in accordance with the present invention.

Advance notification can be provided for programs that are coming soon. For example, the program guide can include a coming soon option, such as coming soon option 72 of FIG. 2. When coming soon option 72 is selected, the program guide can immediately display a list of upcoming programs (e.g., display screen 138 of FIG. 14) or can first display a selectable list of types of upcoming programs, such as coming soon display screen 140 of FIG. 13. Display screen 140 can contain a list of different types of upcoming programs in which the user can be interested. For example, as shown FIG. 13, the list can contain options for upcoming pay-per-view movies, upcoming special events, returning series, announced new series, upcoming programs on a specific channel, etc.

Figure 14:
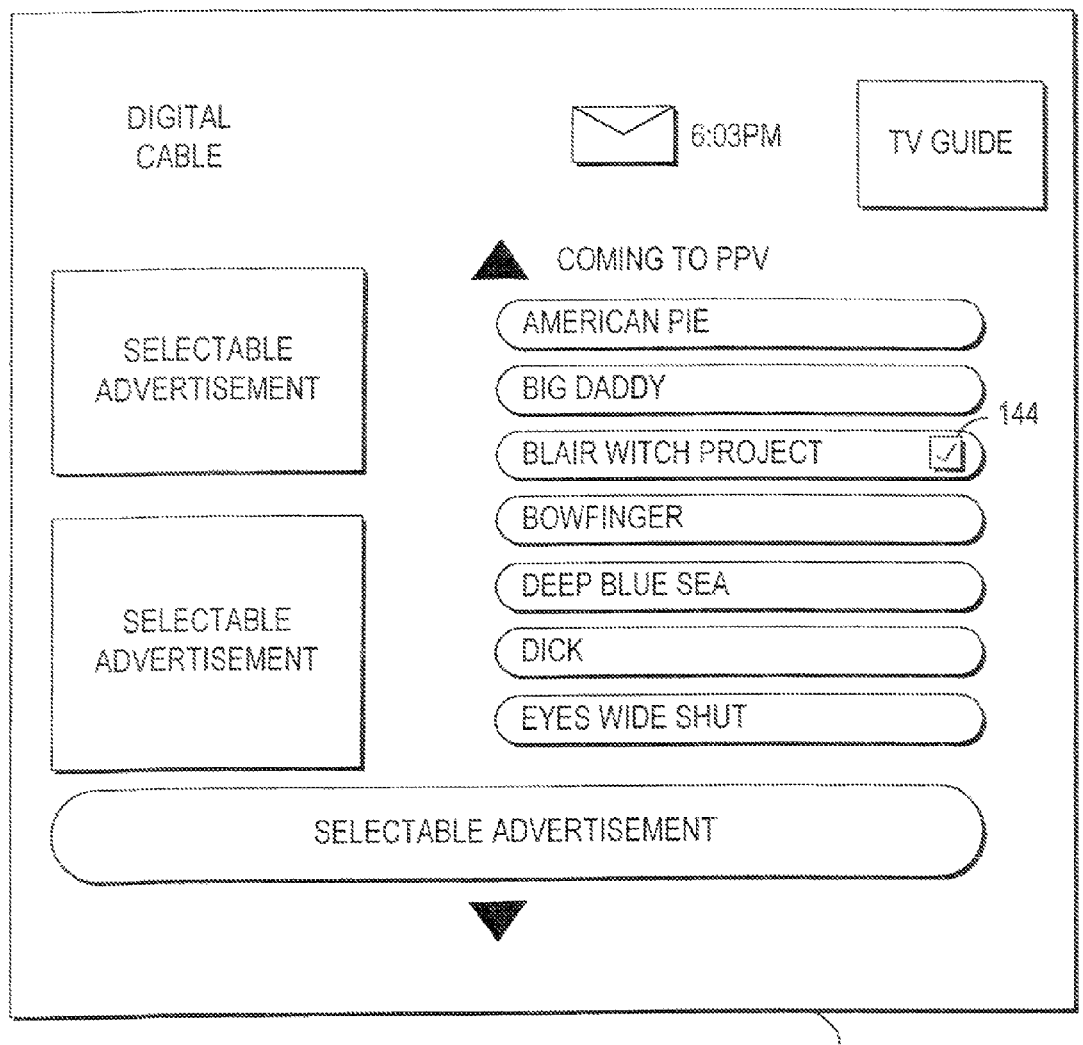
FIG. 14 is a diagram of an illustrative coming soon display screen in accordance with the present invention.

When a user selects an option from display screen 140, such as pay-per-view movies option 142, the program guide can display a coming soon display screen, such as coming soon display screen 138 of FIG. 14. Display screen 138 can contain a list of programs that match the selected program type (e.g., pay-per-view movies) and that are not yet within the current time frame of the program guide. The list can be sorted alphabetically or by any other appropriate criteria. The list can include upcoming programs that have been scheduled to air outside the current time frame of the program guide. If desired, the list can include upcoming programs that have not yet been scheduled. For example, the list can include upcoming programs that have been announced but not yet scheduled. The list can include an indicator for a program, such as indicator 144. Indicator 144 can indicate that the user has already set a notification for that program. When the user selects a program from the list, the program guide can display a notification display screen for that program, such as notification display screen 116 of FIG. 6. Notification display screen 116 can provide the user with the opportunity to set, delete, or modify a notification for the program.

Figure 15:
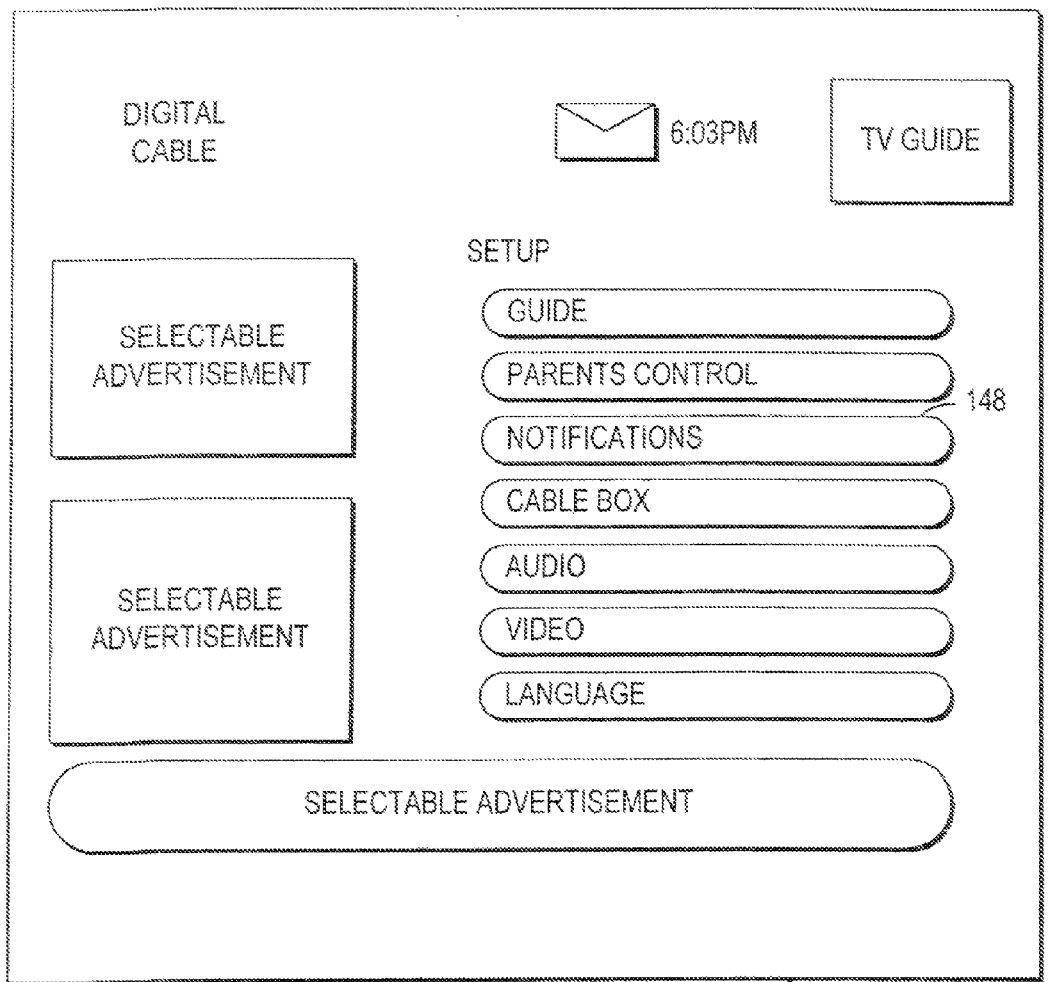
FIG. 15 is a diagram of an illustrative setup display screen in accordance with the present invention.
Figure 16:
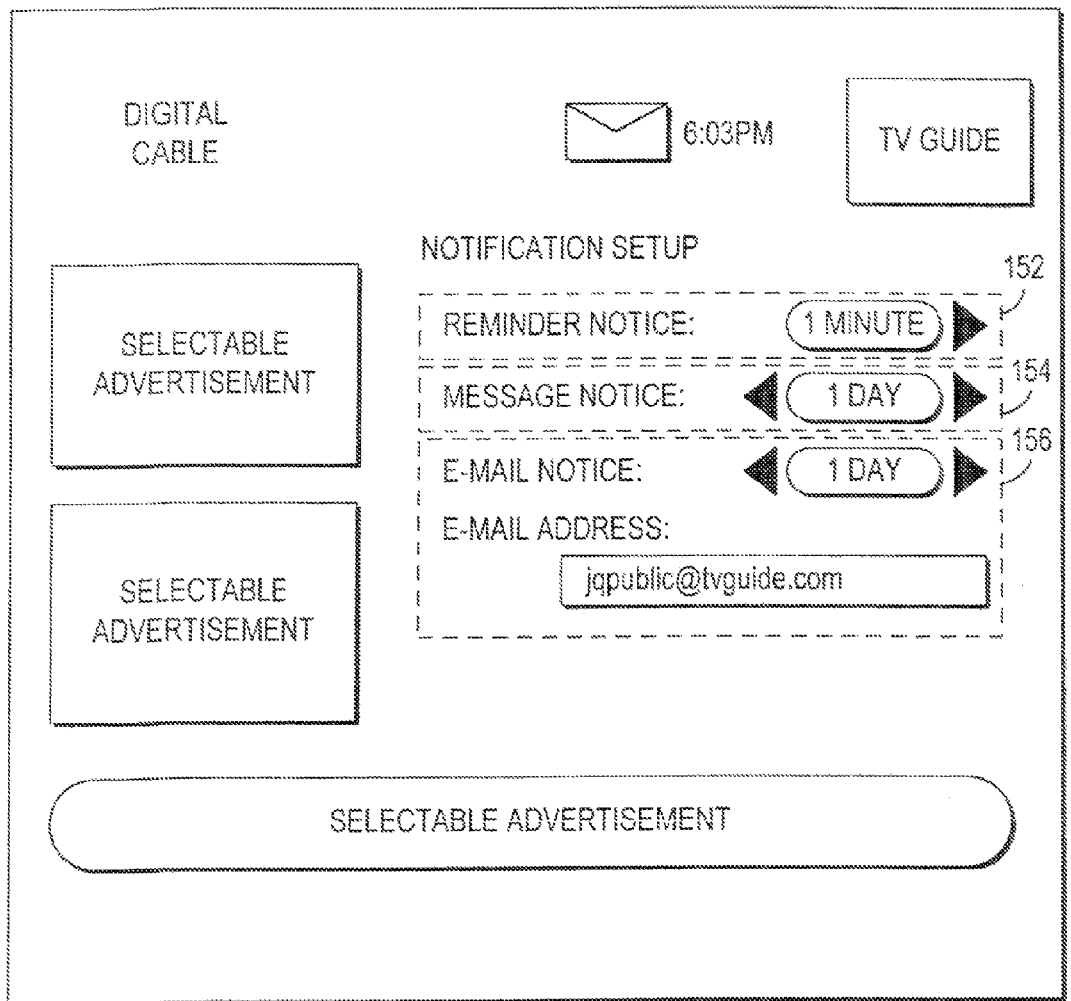
FIG. 16 is a diagram of an illustrative notification setup display screen in accordance with the present invention.

The user can be provided with the opportunity to setup the configuration of notifications. For example, when a user selects a setup option, such as setup option 74 of FIG. 2, the program guide can display a setup display screen, such as setup display screen 146 of FIG. 15. Setup display screen 146 can include notifications setup option 148. When a user selects notifications setup option 148, the program guide can display a notification setup display screen, such as notification setup display screen 150 of FIG. 16. Display screen 150 can include reminder notice setup option 152, message notice setup option 154, and e-mail notice setup option 154. If desired, setup display screen 146 can include an option for specifying whether reminders will be displayed on a television screen, a display remote, or both.

Reminder notice setup option 152 can provide the user with the opportunity to specify how far in advance of a start time of an upcoming program a reminder notification should be displayed. Values for how far in advance a reminder notice can be displayed can be set for example to be in the range of one to fifteen minutes. If desired, reminder notice setup option 152 can not be provided and the program guide can use settings from a general reminders feature (e.g., non-notification reminders). When a program is not in a current time frame of the program guide, a reminder notification for that program can be set. Later, when the program guide determines that the program is now in the current time frame, the program guide can activate the reminder notification at an appropriate time before the start time of that program.

When a user selects message notice setup option 154, the program guide can provide the user with the opportunity to specify the message notice time. The user can set the notice to receive a message notification for a program a few hours before the program or as far ahead of the program as the available program guide data permits (e.g., the length of the current time frame). If desired, the program guide can use a default value for the message notice time (e.g., one day) or can generate the notification message as soon as the program is added to the local program listings database of the program guide.

When a user selects e-mail notice setup option 156, the program guide can provide the user with the opportunity to specify the advance notice time for e-mail notifications. The values or defaults for advance notice time for e-mail notifications can be the same as the values for message notifications.

Notification setup display screen 150 can provide a user with the opportunity to specify an e-mail notification address. If desired, the program guide can allow the user to specify an individual e-mail address for each notification. If desired, the program guide can have an e-mail address for the household as part of an e-mail feature, and can use that address, rather than requiring the user to enter the address again.

If desired, the program guide can provide the user with the opportunity to setup the configuration notifications for each individual program. For example, the program guide can display in a notification display screen (e.g., notification display screen 116 of FIG. 7) a notification setup option, such as notification setup option 119 of FIG. 7. When a user selects notification setup option 119, the program guide can display a notification setup display screen, such as notification setup display screen 150 of FIG. 16, to setup the notifications for that program. An individual program notification setup can be available in addition to a general setup for notifications. If desired, a setup for notifications can include a general option that specifies whether reminders, messages, or e-mails should be generated whenever a program with a notification comes into the current time-frame of the program guide.

When the user sets a notification for a program, the program notification can be stored, preferably in non-volatile memory, at the user television equipment (e.g., user television equipment 44 of FIG. 1). If desired, when the program guide system is in a client-server arrangement, the program notification can be stored at a server (e.g., server 22 at television distribution facility 20 of FIG. 1).

When new schedule items are received by the program guide (either at server 22 or user television equipment 26), the incoming schedule items can be compared with the notification list (e.g., the programs listed in notification list 92 of FIG. 4). When there is a match, the program guide can generate a notification for that program (e.g., reminder notification, e-mail notification, message notification etc.). The type of notification desired can have been set earlier from a display screen, such as notification display screen 116 of FIG. 7. The advance notice time for the notification can have been set earlier from a display screen, such as notification setup display screen 150 of FIG. 16.

For example, when a reminder notification has been set for a program that is determined to be in the current time frame, the program guide can schedule a reminder overlay for a specified number of minutes prior to the start of the program. When a message or e-mail notification has been set, the program guide can immediately generate a notification or can schedule a task to generate a message or e-mail notification an appropriate number of days or hours prior to the scheduled start of the program.

Figure 17:
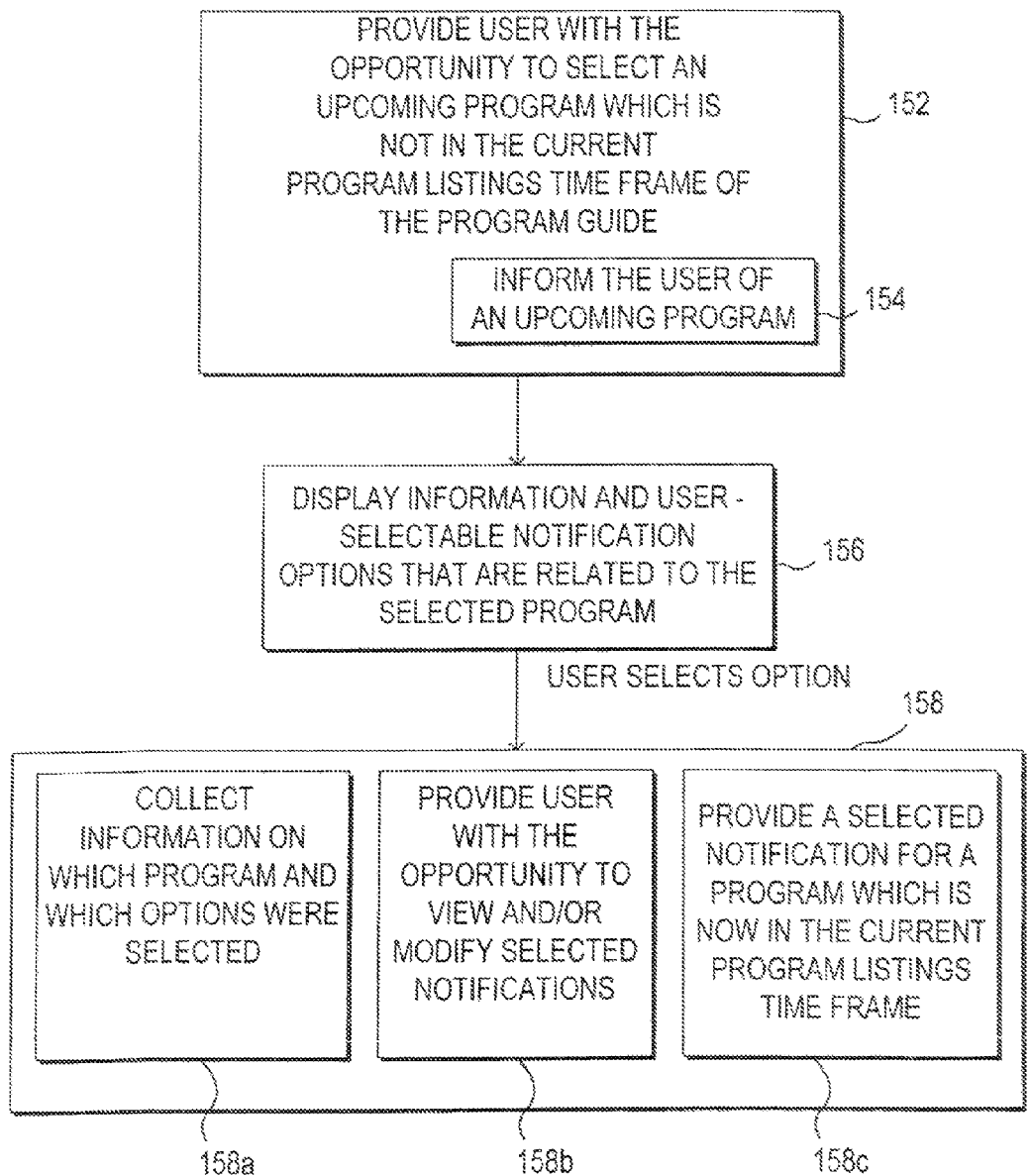
FIG. 17 is a flow chart of illustrative steps involved in providing a notification feature in accordance with the present invention.
Figure 18:
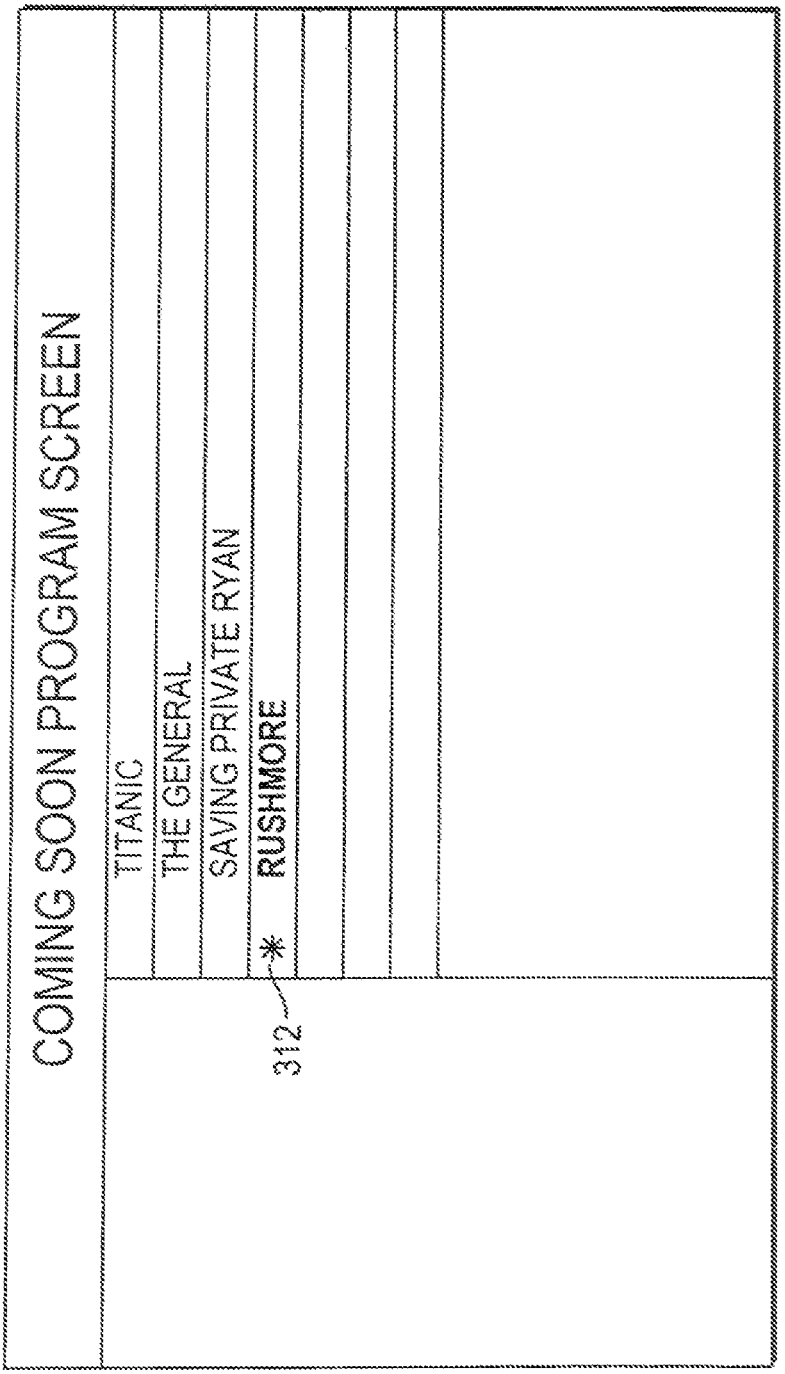
FIG. 18A is a diagram of an illustrative program guide screen containing television program guide listings in accordance with the present invention.
FIG. 18B is a diagram of an illustrative coming soon program screen in accordance with the present invention.

Illustrative steps involved in providing a notification feature are shown in FIG. 17. At step 152, the program guide can provide the user with the opportunity to select or specify an upcoming program which is not yet in the current program listings time frame of the program guide.

If desired, step 152 can include informing the user of an upcoming program (step 154). For example, the program guide can display a coming soon display screen (e.g., coming soon display screen 140 of FIG. 13). The program guide can display a different coming soon display screens based on category, type, actor, genre, etc. (e.g., coming soon display screen 138 of FIG. 14). The program guide can send a message to a user announcing an upcoming program that is not yet in the program listings database of the program guide. The program guide can display advertisements for upcoming programs which are not in the current program listings time frame.

At step 152, the program guide can provide the user with the opportunity to select an upcoming program from a coming soon display screen (e.g., coming soon display screen 138 of FIG. 14), a message display screen (e.g., message display screen 102 of FIG. 6), a new notification display screen (e.g., by entering a program title or partial title from new notification display screen 132 of FIG. 11), a coming soon display screen for a category, such as genre, actor, rating, etc. (e.g., coming soon display screen 138 of FIG. 14 for upcoming pay-per-view programs), etc.

At step 156, the program guide can display information and user-selectable options that are related to the selected program. For example, the program guide can display a description, title, graphics, etc. about the selected program. As for user-selectable options, the program guide can provide the user with the opportunity to select an option to set a message notification (e.g., message option 122 of FIG. 7), to select an option to set an e-mail notification (e.g., e-mail option 124 of FIG. 7), to select an option to track a program (e.g., the program will be added to the notification list but no notification will be generated), to select an option to set a reminder notification (e.g., remind option 120 of FIG. 7), to select an option to purchase the selected program (e.g., order option 108 of FIG. 6), to select an option to have the program guide automatically tune to the channel carrying the select program at or about the time of airing, to select an option to have the program guide automatically cause the program to be recorded when the program airs, etc.

When the user selects an option, the program guide can provide the user with the opportunity to setup features related to the option. For example, the program guide can provide the user with the opportunity to select how far in advance a message, e-mail, or reminder notification should be sent. For purchase, tune, and record options, the program guide can provide the user with the opportunity to specify parameters, such as day of the week, time of day, etc. For example, the user can be allowed to select to a time range in which the program guide is authorized to purchase, tune, or record a program.

At step 158, when the user has selected an option, the program guide can collect information on which programs and which options have been selected (step 158a). The information can be collected at a central location (e.g., television distribution facility 20 of FIG. 1). The information can be used to influence the scheduling of programming, the marketing of programming, the distribution of programming, and the targeting of advertisements, and to generate e-mail notifications.

Step 158 can include providing the user with the opportunity to view or modify notifications set for programs (step 158b). For example, the program guide can provide the user with the opportunity at any time to view a notifications list (e.g., notifications list 92 of FIG. 4). An item in the notification list can be automatically removed from the list after a selected notification has been provided or can be removed a predetermined number of days after the program has been received within the local program guide database (e.g., the current program listing time frame). If desired, an item in the list can be removed after the program has been viewed or after the program is no longer available in the current time frame. The list can include an indication of which programs are presently in the current time frame of the program guide. From the notification list, the user can be provided with the opportunity to access a notification display screen (e.g., notification display screen 116 of FIG. 7) in order to view, modify, or delete a notification that has been set for a program.

Step 158 can include providing a notification for a selected program which is now in the current program listings time frame (step 158c). When the user has set a notification message or reminder, the program guide can display a reminder notification or send a message notification when the program is determined to be in the current time frame of the program guide. If desired, a message notification can be sent or a reminder notification can be displayed at a predetermined notice time prior to the airing of the program. When the user has set an e-mail notification, an e-mail notification can be sent when it is determined that the program is in the current time frame of the program guide. If desired, the e-mail notification can be sent at a predetermined time prior to the airing of the program. The e-mail notification can be sent from a central facility (e.g., television distribution facility 20 of FIG. 1) or the program guide can generate the e-mail notification locally at user television equipment (e.g., user television equipment 26 of FIG. 1). After a notification has been provided, the status of a notification in the notification list can be modified (e.g., the program can be removed from the list when all the notifications which had been set by user have been performed). At step 158c, the program guide can provide notification options, such as to tune or record the selected program.

In the following discussion below with reference to FIGS. 18 through 32, the present invention is discussed sometimes primarily in the context of a program guide system with a mouse, a keyboard, or both as a user interface device (e.g., an on-line PC based program guide system). It is to be understood that the present invention is not limited to such an arrangement.

FIG. 18A shows an illustrative program guide display screen that can be provided in a PC based program guide system. Display screen 218 contains program listings 220 that can be organized in channel order from top to bottom and by broadcast time from left to right. Cursors 222 and 224 can be used to navigate to earlier or later time periods, respectively. Browser cursors 226 and 228 allow a user to scroll through program listings 220. The user can also navigate through program listings 220 with time navigation buttons 230 to view program listings for different times in the day. Calendar buttons 232 can be used to view program listings for different days of a month. The user can choose between various available view options by selecting a desired time, channel, category, or search button from among view buttons 234.

FIG. 18B shows an illustrative coming soon program display screen 310 that can be provided as an option from the display screen 218 of FIG. 18A, or can be accessed independently. The user can activate the coming soon program display screen from display screen 218 of FIG. 18A by means of box 236. Included on the coming soon program screen are non-frame television programs which are outside the current display time frame. For example, in FIG. 18B, there are several movies, including Titanic, The General, and Saving Private Ryan, all of which (at least for the purposes of this description) have not yet been released on cable television.

Program guide screen 310 can also include one or more markers 312 that indicate that information regarding other programs is now available to the user (e.g., a listing for Rushmore is in the current time frame). When data regarding a non-frame television program is added, the non-frame television program by definition becomes an in-frame television program. The marker can be, for example, an icon, a color, a display order, and any combination thereof. More than one type of marker can be used on a single screen to indicate more than one type of information regarding the television program. For example, a star placed next to the listing can indicate that the program will be broadcast on a pay-per-view channel and an underline can indicate optional on-line links to more information and promotional offers.

If a program is selected from coming soon display screen 310 of FIG. 18B, the user can be presented with a notification order display screen, such as notification order display screen 410 of FIG. 19. Notification order display screen 410 can contain user-selectable options for ordering a notification. Notifications can notify the user when a particular television program is to be broadcast. As defined herein, the term "broadcast" refers to the process of airing scheduled television programs by traditional television broadcast techniques, cable systems, or satellite systems. It will be appreciated that the methods and apparatus described herein can also be used in connection with non-frame videos-on-demand.

FIG. 19 shows fields 414 and 418 in notification order display screen 410, which allow the user to enter a name and electronic mail address, respectively, of the person receiving the notification. If desired, the user's name and electronic mail address can be automatically entered in fields 414 and 418 based on information previously provided to the system (e.g., information provided when the user registered with the television program guide service). Use of electronic mail to remind users of program events which are in the current time frame is known (See, U.S. patent application Ser. No. 08/987,740, filed Dec. 9, 1997, which is hereby incorporated by reference in its entirety).

If the user is browsing program listings from a computer located at the user's office, the user can wish to have notifications addressed to his home (i.e., using his personal Internet access account and the electronic mail address for the system at home). Alternatively, the user can wish to have notifications sent to an office electronic mail address. If the user has a common electronic mail address for both home and the office, notifications can be accessed at either location. If desired, the system can provide more than one field 418 (e.g., field 421) so that notifications can be sent to more than one electronic mail address.

Notification order display screen 410 of FIG. 19 can also provide several user-selectable options that specify when and how often the user will be notified of the airing of selected non-frame television programs. For example, notification order screen 410 can contain notify me box 424. Selecting an option in notify me box 424 allows the user to specify how often the system will generate and send a notification to the user. As shown in FIG. 19, the options in notify me box 424 can allow the user to be notified of the selected program only once, each time the program is being broadcast, each time the program is broadcast in a month, or at some other specified time. If "other" in notify me box 424 is selected, the user can be presented with screen 510 shown in FIG. 20. Such options can be selected with a mouse, keyboard, or any other suitable interface device. Screen 510 allows a user to specify a time period during which notifications will be generated and sent. The user can specify a time period by entering information in box 513.

Notification order display screen 410 of FIG. 19 can also contain how soon box 430. Selecting an option in box 430 allows the user to indicate how soon before the broadcast of the selected program notifications are to be generated and sent to the user. As shown in FIG. 19, box 430 can contain options that allow the user to be notified 1 hour, 1 day, 2 days, or another predetermined period of time before the selected program is broadcast. If "other" is selected in box 430, the user can be presented with display screen 510 of FIG. 21, which allows the user to specify a desired lead time before a scheduled event by completing box 515.

Figure 21:
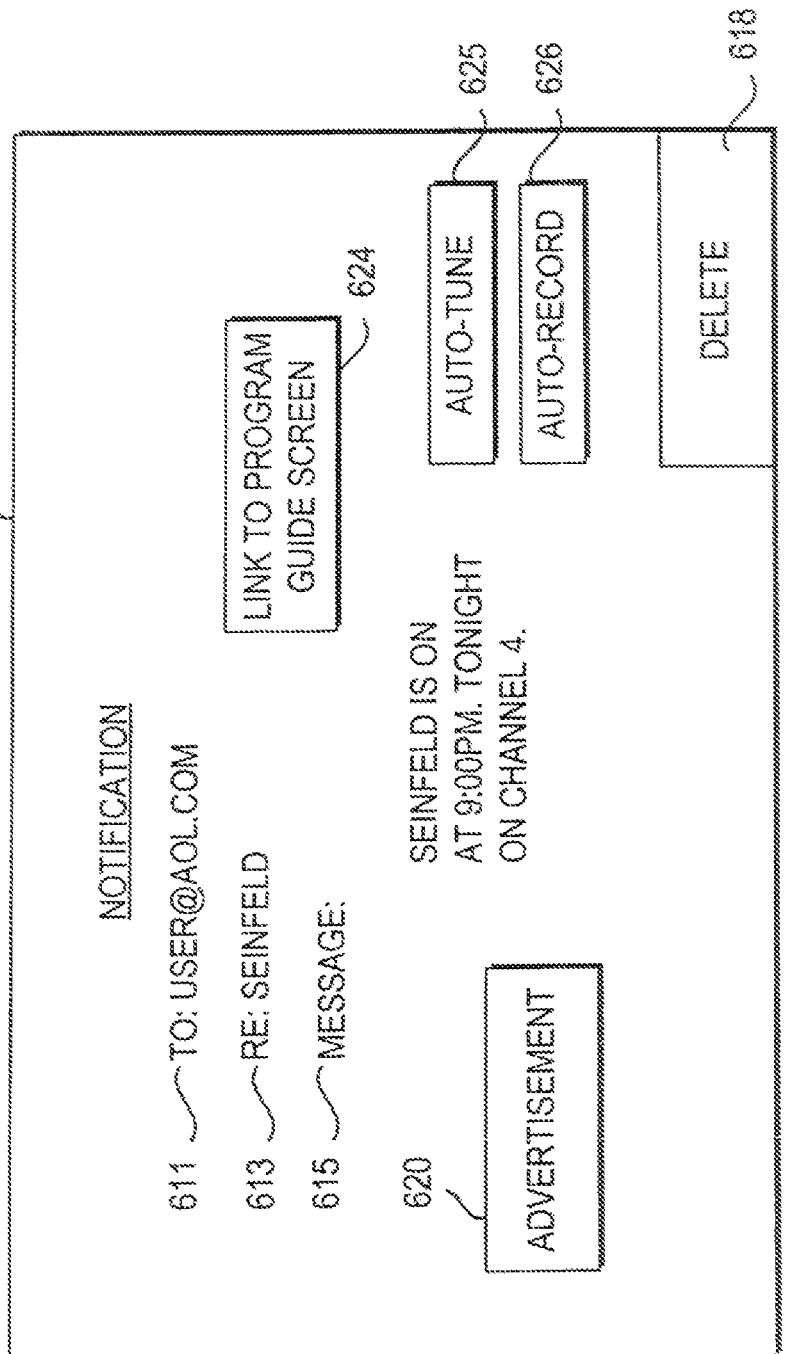
FIG. 21 is a diagram of an illustrative notification in accordance with the present invention.

Upon completing display screen 510 of FIG. 21, the user can submit the information that has been entered by selecting enter button 517. The user can exit display screen 510 without submitting the information by selecting exit button 519. If the user selects either enter button 517 or exit button 519, the user can be returned to the previous screen, such as notification order display screen 410.

The options that the user selects in boxes 424 and 430 of order display screen 410 determine, respectively, how often and when notifications will be sent. For example, a user can select a program from coming soon program display screen 310 of FIG. 18B. When the user selects a program from display screen 310 of FIG. 18B, the user can be presented with order display screen 410 of FIG. 19. If the user selects the "1 hour" option in box 430 and the "each time being broadcast" option in notify me box 424, the user will receive notifications (assuming fields 414 and 418 are completed with the user's own information) 1 hour before each broadcast of the program.

At any time during the completion of notification order display screen 410 (FIG. 19), the user can cancel the notification order by selecting cancel box 480. Selecting cancel box 480 can return the user to display screen 310 of FIG. 18B. Upon completing order notification display screen 410, the user can submit a notification order for processing by selecting submit box 440.

FIG. 21 shows an illustrative electronic mail notification 600. Notification 600 can display electronic mail address 611 of the person to whom the mail is being sent, name 613 of the program for which the notification is being sent, and information on when the television program is to be broadcast. The user can delete notification 600 by selecting delete button 618. An advertisement 620 (text, graphics, video etc.) can be included in or attached to the notification if desired. The advertisement can be provided using information stored in a remote or local database, such as databases 16, 24, or 36.

Notification 600 can also include interactive links to various screens and services, including, but not limited to a link to program guide display screen 218 and a link promotional offers that can or can not be interactive. When a user selects interactive options 625 and 626, program events can be automatically ordered/tuned, or recorded. If desired, these options can be automatically removed from the notification after being selected by a user to reduce clutter on the notification. The options can also be automatically removed after a predetermined period of time following a particular event. A particular event can occur (1) when data regarding the program is received by a local database, (2) when data regarding the program is received by a remote server, or (3) when the user is notified.

Another aspect of the invention relates to management of one's notifications. If desired, notification order display screen 410 of FIG. 19 can contain view current box 483. If view current box 483 is selected, the user can be presented with illustrative current notifications display screen 710 of FIG. 22. Another way that the user can reach current notifications screen 710 of FIG. 22 is by selecting view current notifications button 233 in display screen 218 of FIG. 18A. Current notifications display screen 710 contains a list of all the user's currently requested notifications. Information, such as the program name, type of notification, and the date and time submitted can be displayed.

FIG. 22, shows an illustrative example of a current notification entry for the program "Primal Fear". This notification was submitted by the user on Nov. 1, 1997 at 3:03 p.m. and is set to notify the user one hour before each broadcast. Entries can be added to the current notification list as soon as the user sets a new notification (e.g., by selecting submit button 440 from order notification screen 410 of FIG. 3). When an item in list is selected (e.g., positioning a highlight region on an item and pressing a data entry key), display screen 410 of FIG. 19 can be displayed to allow the user to modify the notification configuration for the selected item in the list. If desired, the user can provided with the opportunity to change the configuration for an item in the list from the same display screen, display screen 710. An item can be removed from the list (e.g., by positioning a highlight region on an item and selecting cancel 712).

Another component of display screen 218 is new notifications box 231. New notifications box 231, which can be adjacent to the program navigation controls of display 218, allows the user to order notifications without using program listings 220. If new notifications box 231 is selected, the user can be presented with illustrative new notifications display screen 810 of FIG. 24.

New notifications screen 810 contains user-selectable options similar to the options contained in notification order display screen 410 of FIG. 19. For example, new notifications display screen 810 contains user information box 813, how soon box 830, and notify me box 824. However, new notifications screen 810 allows the user to enter the title of a non-frame television program.

If the user does not enter the exact title of the non-frame television program in new notifications display screen 810, the data in the database 16, 24, or 36 or any other suitable set of television program listings data can be scanned to find the program or programs that most closely match the program title indicated by the user. If several matches are found, a list of the program matches can be presented to the user and the user can choose the actual program desired. Once the user has chosen a program from the list, the program title in box 818 can be automatically updated. If no matches are found, or if the user does not accept one of the offered choices, the title can be left as entered.

A user can exit new notifications display screen 810 at any time by selecting exit button 880. Selecting exit button 880 can return the user to display screen 218 of FIG. 18A.

Upon completing new notifications display screen 810, the user can submit the notification order for processing by selecting submit box 840. Selecting submit box 840 allows program guide system 10 (FIG. 1) to process the request. The request can be processed in the same way a notification request can be processed when ordered from notification order display screen 410 of FIG. 19.

The user can reach current notifications display screen 710 of FIG. 22 from new notifications display screen 810 of FIG. 23 by selecting view current notifications button 883.

The foregoing is merely illustrative of the principles of this invention and various modifications can be made by those skilled in the art without departing from the scope and spirit of the invention.

What is claimed is:

1. A method for accessing unscheduled programs, comprising:
   generating for display on a display device, using control circuitry implemented on user equipment, a plurality of interactive program listings for unscheduled programs that will be broadcast at a future time, wherein the unscheduled programs are outside a program listings time frame that is currently available to a user;
   receiving, using the control circuitry, a user selection of an interactive program listing of the displayed plurality of interactive program listings for unscheduled programs associated with a program that is unscheduled at the time of the user selection, wherein the user selection is stored;
   periodically receiving new scheduling data indicating programs available during a current program listings time frame;
   determining, using the control circuitry, based on the stored user selection, that the new scheduling data includes schedule information for the user selected interactive program listing associated with the program that was unscheduled at the time of the user selection;
   generating, using the control circuitry, a program-specific availability notification to the user indicating the availability of the previously selected unscheduled program associated with the user selected interactive program listing in response to the determination; and
   generating for display on the display device, using the control circuitry, a symbol on the previously selected unscheduled program of the displayed plurality of interactive program listings for unscheduled programs, wherein the symbol visually distinguishes the previously selected unscheduled program from the plurality of interactive program listings not previously selected by the user.

2. The method of claim 1 further comprising generating for display on the display device information with the plurality of program listings, wherein the information informs the user that the unscheduled programs are outside the program listings time frame that is currently available to the user.

3. The method of claim 1 further comprising generating for display on the display device information with the plurality of program listings, wherein the information informs the user that the unscheduled programs are expected to be available at a later time.

4. The method of claim 1 further comprising displaying generating for display on the display device a list of programs for which the notification is to be generated.

5. The method of claim 1 wherein a generating the notification includes generating an e-mail notification.

6. The method of claim 1 wherein generating the notification includes generating a message notification.

7. The method of claim 1 wherein generating the notification includes generating a reminder notification.

8. The method of claim 1 further comprising allowing the user to set up a configuration of the notification.

9. A system for accessing unscheduled programs, comprising control circuitry implemented on user equipment that:

generates for display on a display device, using the control circuitry, a plurality of interactive program listings for unscheduled programs that will be broadcast at a future time, wherein the unscheduled programs are outside a program listings time frame that is currently available to a user;

receives, using the control circuitry, a user selection of an interactive program listing of the displayed plurality of interactive program listings for unscheduled programs associated with a program that is unscheduled at the time of the user selection, wherein the user selection is stored;

periodically receives new scheduling data indicating programs available during a current program listings time frame;

determines, using the control circuitry, based on the stored user selection, that the new scheduling data includes schedule information for the user selected interactive program listing associated with the program that was unscheduled at the time of the user selection;

generates, using the control circuitry, a program-specific availability notification to the user indicating the availability of the previously selected unscheduled program associated with the user selected interactive program listing in response to the determination; and generates for display on the display device, using the control circuitry, a symbol on the previously selected unscheduled program of the displayed plurality of interactive program listings for unscheduled programs, wherein the symbol visually distinguishes the previously selected unscheduled program from the plurality of interactive program listings not previously selected by the user.

10. The system of claim 9 wherein the user equipment is further configured to generate for display on the display device information with the plurality of program listings, wherein the information informs the user that the unscheduled programs are outside the program listings time frame that is currently available to the user.

11. The system of claim 9 wherein the user equipment is further configured to generate for display on the display device information with the plurality of program listings, wherein the information informs the user that the unscheduled programs are expected to be available at a later time.

12. The system of claim 9 wherein the user equipment is further configured to generate for display on the display device a list of programs for which the notification is to be generated.

13. The system of claim 9 wherein the user equipment is further configured to generate an e-mail notification.

14. The system of claim 9 wherein the user equipment is further configured to generate a message notification.

15. The system of claim 9 wherein the user equipment is further configured to generate a reminder notification.

16. The system of claim 9 wherein the user equipment is further configured to allow the user to set up a configuration of the notification.

* * * * *